United States Patent
Zalewski

(10) Patent No.: US 8,142,288 B2
(45) Date of Patent: Mar. 27, 2012

(54) BASE STATION MOVEMENT DETECTION AND COMPENSATION

(75) Inventor: Gary M. Zalewski, Oakland, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 410 days.

(21) Appl. No.: 12/463,360

(22) Filed: May 8, 2009

(65) Prior Publication Data

US 2010/0285883 A1    Nov. 11, 2010

(51) Int. Cl.
*A63F 9/24* (2006.01)

(52) U.S. Cl. ............... 463/39; 463/36; 463/37

(58) Field of Classification Search ............ 463/36–39
See application file for complete search history.

(56) References Cited

U.S. PATENT DOCUMENTS

| | | | |
|---|---|---|---|
| 3,943,277 A | 3/1976 | Everly et al. ................. | 348/169 |
| 4,263,504 A | 4/1981 | Thomas ........................ | 235/454 |
| 4,313,227 A | 1/1982 | Eder ............................. | 398/106 |
| 4,558,864 A | 12/1985 | Medwedeff .............. | 273/148 B |
| 4,565,999 A | 1/1986 | King et al. ................... | 345/158 |
| 4,802,227 A | 1/1989 | Elko et al. ...................... | 381/92 |
| 4,823,001 A | 4/1989 | Kobayashi et al. .......... | 356/616 |
| 4,843,568 A | 6/1989 | Krueger et al. .............. | 382/100 |
| 5,034,986 A | 7/1991 | Karmann et al. ............. | 382/103 |
| 5,055,840 A | 10/1991 | Bartlett ......................... | 341/31 |
| 5,111,401 A | 5/1992 | Everett et al. ................. | 701/24 |
| 5,144,594 A | 9/1992 | Gilchrist ....................... | 367/129 |
| 5,260,556 A | 11/1993 | Lake et al. .................... | 235/494 |
| 5,297,061 A | 3/1994 | Dementhon et al. ......... | 345/180 |
| 5,335,011 A | 8/1994 | Addeo et al. .................. | 348/15 |
| 5,394,168 A | 2/1995 | Smith, III et al. ............ | 345/156 |
| 5,426,450 A | 6/1995 | Drumm ........................ | 345/168 |
| 5,455,685 A | 10/1995 | Mori ............................. | 348/363 |
| 5,473,701 A | 12/1995 | Cezanne et al. ................ | 381/92 |

(Continued)

FOREIGN PATENT DOCUMENTS

EP    0353200    1/1990

(Continued)

OTHER PUBLICATIONS

Ephraim et al. "Speech Enhancement Using a Minimum Mean—Square Error Log—Spectral Amplitude Estimator", 1985, IEEE.

(Continued)

*Primary Examiner* — N Drew Richards
*Assistant Examiner* — Yu-Hsi D Sun
(74) *Attorney, Agent, or Firm* — Martine Penilla Group LLP

(57) ABSTRACT

Method and systems for processing interactive communication received from input devices, which interface with a computer program that executes at a computer, are provided. The method includes receiving input data from a first input device and a second input device at a base station that is interfaced with the computer. The first and second input devices are movable independently of one another to interactively interface with the computer program. The method tracks a position of the first and second input devices through the base station and identifies a near-identical change in position of the tracked position of the first and second input devices. The method then sets a flag upon identifying the near-identical change in position. The flag is processed by the computer program to set an action to take during interactivity with the computer program. In one example, the base station includes an inertial sensor that can confirm movement. If movement is confirmed, the flag is processed to take the action, as defined within the computer program.

10 Claims, 16 Drawing Sheets

U.S. PATENT DOCUMENTS

| | | | |
|---|---|---|---|
| 5,485,273 A | 1/1996 | Mark et al. | 356/350 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,731 A | 3/1997 | Bouton et al. | 463/37 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,675,825 A | 10/1997 | Dreyer et al. | 395/800 |
| 5,675,828 A | 10/1997 | Stoel et al. | 395/825 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |
| 5,846,086 A | 12/1998 | Bizzi et al. | 434/247 |
| 5,850,222 A | 12/1998 | Cone | 345/418 |
| 5,850,473 A | 12/1998 | Andersson | 382/165 |
| 5,861,910 A | 1/1999 | McGarry et al. | 348/87 |
| 5,870,100 A | 2/1999 | DeFreitas | 345/441 |
| 5,883,616 A | 3/1999 | Koizumi et al. | 345/158 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,923,306 A | 7/1999 | Smith et al. | 345/2 |
| 5,923,318 A | 7/1999 | Zhai et al. | 345/157 |
| 5,929,444 A | 7/1999 | Leichner | 250/341.7 |
| 5,930,383 A | 7/1999 | Netaer | 382/154 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,993,314 A | 11/1999 | Dannenberg et al. | 461/1 |
| 6,009,210 A | 12/1999 | Kang | 382/276 |
| 6,021,219 A | 2/2000 | Andersson et al. | 382/190 |
| 6,031,545 A | 2/2000 | Ellenby et al. | 345/435 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,075,895 A | 6/2000 | Qiao et al. | 382/218 |
| 6,078,789 A | 6/2000 | Bodenmann et al. | 455/66 |
| 6,091,905 A | 7/2000 | Yahav et al. | 396/106 |
| 6,094,625 A | 7/2000 | Ralston | 702/150 |
| 6,097,369 A | 8/2000 | Wambach | 345/158 |
| 6,100,517 A | 8/2000 | Yahav et al. | 250/208.1 |
| 6,100,895 A | 8/2000 | Miura et al. | 345/426 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,144,367 A | 11/2000 | Berstis | 345/158 |
| 6,151,009 A | 11/2000 | Kanade et al. | 345/641 |
| 6,160,540 A | 12/2000 | Fishkin et al. | 345/184 |
| 6,166,744 A | 12/2000 | Jaszlics et al. | 345/435 |
| 6,173,059 B1 | 1/2001 | Huang et al. | 381/92 |
| 6,175,343 B1 | 1/2001 | Mitchell et al. | 345/8 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,282,362 B1 | 8/2001 | Murphy et al. | 386/46 |
| 6,295,064 B1 | 9/2001 | Yamaguchi | 345/419 |
| 6,297,838 B1 | 10/2001 | Chang et al. | 715/863 |
| 6,304,267 B1 | 10/2001 | Sata | 345/427 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,392,644 B1 | 5/2002 | Miyata et al. | 345/419 |
| 6,394,897 B1 | 5/2002 | Togami | 463/4 |
| 6,400,374 B2 | 6/2002 | Lanier | 345/630 |
| 6,409,602 B1 | 6/2002 | Wiltshire et al. | 463/42 |
| 6,411,392 B1 | 6/2002 | Bender et al. | 358/1.14 |
| 6,411,744 B1 | 6/2002 | Edwards | 382/294 |
| 6,417,836 B1 | 7/2002 | Kumar et al. | 345/156 |
| 6,441,825 B1 | 8/2002 | Peters | 345/473 |
| 6,473,516 B1 | 10/2002 | Kawaguchi et al. | 382/100 |
| 6,498,860 B1 | 12/2002 | Sasaki et al. | 382/103 |
| 6,504,535 B1 | 1/2003 | Edmark | 345/419 |
| 6,516,466 B1 | 2/2003 | Jackson | 725/62 |
| 6,533,420 B1 | 3/2003 | Eichenlaub | 353/7 |
| 6,542,927 B2 | 4/2003 | Rhoads | 709/217 |
| 6,545,706 B1 | 4/2003 | Edwards et al. | 348/169 |
| 6,546,153 B1 | 4/2003 | Hoydal | 382/285 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,587,573 B1 | 7/2003 | Stam et al. | 382/104 |
| 6,593,956 B1 | 7/2003 | Potts et al. | 348/14.09 |
| 6,621,938 B1 | 9/2003 | Tanaka et al. | 382/276 |
| 6,628,265 B2 | 9/2003 | Hwang | 345/156 |
| 6,637,883 B1 | 10/2003 | Tengshe et al. | 351/210 |
| 6,661,914 B2 | 12/2003 | Dufour | 382/154 |
| 6,674,415 B2 | 1/2004 | Nakamura et al. | 345/32 |
| 6,676,522 B2 | 1/2004 | Rowe et al. | 463/42 |
| 6,677,967 B2 | 1/2004 | Sawano et al. | 715/839 |
| 6,677,987 B1 | 1/2004 | Girod | 348/171 |
| 6,709,108 B2 | 3/2004 | Levine et al. | 351/211 |
| 6,720,949 B1 | 4/2004 | Pryor et al. | 345/158 |
| 6,727,988 B2 | 4/2004 | Kim et al. | 356/319 |
| 6,741,741 B2 | 5/2004 | Farrell | 382/199 |
| 6,746,124 B2 | 6/2004 | Fischer et al. | 353/43 |
| 6,751,338 B1 | 6/2004 | Wallack | 382/106 |
| 6,753,849 B1 | 6/2004 | Curran et al. | 345/158 |
| 6,767,282 B2 | 7/2004 | Matsuyama et al. | 463/3 |
| 6,769,769 B2 | 8/2004 | Podlleanu et al. | 351/221 |
| 6,772,057 B2 | 8/2004 | Breed et al. | 701/45 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,791,531 B1 | 9/2004 | Johnston et al. | 345/157 |
| 6,795,068 B1 | 9/2004 | Marks | 345/419 |
| 6,809,776 B1 | 10/2004 | Simpson et al. | 348/565 |
| 6,819,318 B1 | 11/2004 | Geng | 345/420 |
| 6,847,311 B2 | 1/2005 | Li | 341/28 |
| 6,863,609 B2 | 3/2005 | Okuda et al. | 463/36 |
| 6,881,147 B2 | 4/2005 | Naghi et al. | 463/35 |
| 6,884,171 B2 | 4/2005 | Eck et al. | 463/42 |
| 6,890,262 B2 | 5/2005 | Oishi et al. | 463/31 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,928,180 B2 | 8/2005 | Stam et al. | 382/104 |
| 6,930,725 B1 | 8/2005 | Hayashi | 348/373 |
| 6,931,596 B2 | 8/2005 | Gutta et al. | 715/728 |
| 6,943,776 B2 | 9/2005 | Ehrenburg | 345/168 |
| 6,945,653 B2 | 9/2005 | Kobori et al. | 353/30 |
| 6,951,515 B2 | 10/2005 | Ohshima et al. | 463/31 |
| 6,952,198 B2 | 10/2005 | Hansen | 345/158 |
| 6,965,362 B1 | 11/2005 | Ishizuka | 345/82 |
| 6,970,183 B1 | 11/2005 | Monroe | 348/143 |
| 6,990,639 B2 | 1/2006 | Wilson | 715/863 |
| 7,006,009 B2 | 2/2006 | Newman | 340/854.5 |
| 7,016,411 B2 | 3/2006 | Azuma et al. | 375/240.08 |
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |

| Patent No. | Date | Inventor | Class |
|---|---|---|---|
| 7,043,056 B2 | 5/2006 | Edwards et al. | 382/103 |
| 7,054,452 B2 | 5/2006 | Ukita | 381/92 |
| 7,059,962 B2 | 6/2006 | Watashiba | 463/2 |
| 7,061,507 B1 | 6/2006 | Tuomi et al. | 345/611 |
| 7,071,914 B1 | 7/2006 | Marks | 345/156 |
| 7,090,352 B2 | 8/2006 | Kobor et al. | 353/30 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,116,330 B2 | 10/2006 | Marshall et al. | 345/474 |
| 7,116,342 B2 | 10/2006 | Dengler et al. | 345/158 |
| 7,121,946 B2 | 10/2006 | Paul et al. | 463/36 |
| 7,139,767 B1 | 11/2006 | Taylor et al. | 707/102 |
| 7,148,922 B2 | 12/2006 | Shimada | 348/370 |
| 7,164,413 B2 | 1/2007 | Davis et al. | 345/163 |
| 7,183,929 B1 | 2/2007 | Antebi et al. | 340/573.1 |
| 7,212,308 B2 | 5/2007 | Morgan | 358/1.18 |
| 7,223,173 B2 | 5/2007 | Masuyama et al. | 463/36 |
| 7,224,384 B1 | 5/2007 | Iddan et al. | 348/207.99 |
| 7,227,526 B2 | 6/2007 | Hildreth et al. | 345/156 |
| 7,227,976 B1 | 6/2007 | Jung et al. | 382/103 |
| 7,245,273 B2 | 7/2007 | Eberl et al. | 351/211 |
| 7,259,375 B2 | 8/2007 | Tichit et al. | 250/341.8 |
| 7,263,462 B2 | 8/2007 | Funge et al. | 702/179 |
| 7,274,305 B1 | 9/2007 | Luttrell | 340/870.02 |
| 7,283,679 B2 | 10/2007 | Okada et al. | 382/260 |
| 7,296,007 B1 | 11/2007 | Funge et al. | 706/47 |
| 7,301,530 B2 | 11/2007 | Lee et al. | 345/158 |
| 7,305,114 B2 | 12/2007 | Wolff et al. | 709/200 |
| 7,346,387 B1 | 3/2008 | Wachter et al. | 600/476 |
| 7,352,359 B2 | 4/2008 | Zalewski et al. | 345/156 |
| 7,364,297 B2 | 4/2008 | Goldfain et al. | 351/206 |
| 7,379,559 B2 | 5/2008 | Wallace et al. | 382/100 |
| 7,391,409 B2 | 6/2008 | Zalewski et al. | 345/156 |
| 7,436,887 B2 | 10/2008 | Yeredor et al. | 375/240 |
| 7,446,650 B2 | 11/2008 | Schofield et al. | 340/425.5 |
| 7,545,926 B2 | 6/2009 | Mao | 379/406.08 |
| 7,558,698 B2 | 7/2009 | Funge et al. | 702/179 |
| 7,613,610 B1 | 11/2009 | Zimmerman et al. | 704/235 |
| 7,623,115 B2 | 11/2009 | Marks | 345/156 |
| 7,627,139 B2 | 12/2009 | Marks et al. | 382/103 |
| 7,636,645 B1 | 12/2009 | Yen et al. | 702/152 |
| 7,697,700 B2 | 4/2010 | Mao | 381/94.3 |
| 7,721,231 B2 | 5/2010 | Wilson | 715/863 |
| 2001/0056477 A1 | 12/2001 | McTernan et al. | 709/219 |
| 2002/0010655 A1 | 1/2002 | Kjallstrom | 705/27 |
| 2002/0056114 A1 | 5/2002 | Fillebrown et al. | 725/78 |
| 2002/0072414 A1 | 6/2002 | Stylinski et al. | 463/42 |
| 2002/0075286 A1 | 6/2002 | Yonezawa et al. | 345/679 |
| 2002/0083461 A1 | 6/2002 | Hutcheson et al. | 725/62 |
| 2002/0085097 A1 | 7/2002 | Colmenarez et al. | 348/211 |
| 2002/0094189 A1 | 7/2002 | Navab et al. | 386/4 |
| 2002/0126899 A1 | 9/2002 | Farrell | 382/224 |
| 2002/0134151 A1 | 9/2002 | Naruoka et al. | 73/291 |
| 2002/0158873 A1 | 10/2002 | Williamson | 345/427 |
| 2003/0014212 A1 | 1/2003 | Ralston et al. | 702/150 |
| 2003/0022716 A1 | 1/2003 | Park et al. | 463/36 |
| 2003/0093591 A1 | 5/2003 | Hohl | 710/22 |
| 2003/0100363 A1 | 5/2003 | Ali | 436/30 |
| 2003/0160862 A1 | 8/2003 | Charlier et al. | 348/14.08 |
| 2003/0232649 A1 | 12/2003 | Gizis et al. | 463/40 |
| 2004/0001082 A1 | 1/2004 | Said | 345/730 |
| 2004/0017355 A1 | 1/2004 | Shim | 345/157 |
| 2004/0063480 A1 | 4/2004 | Wang | 463/8 |
| 2004/0063481 A1 | 4/2004 | Wang | 463/8 |
| 2004/0070565 A1 | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0140955 A1 | 7/2004 | Metz | 345/166 |
| 2004/0150728 A1 | 8/2004 | Ogino | 348/239 |
| 2004/0178576 A1 | 9/2004 | Hillis et al. | 273/148 |
| 2004/0213419 A1 | 10/2004 | Varma et al. | 381/92 |
| 2004/0227725 A1 | 11/2004 | Calarco et al. | 345/156 |
| 2004/0254017 A1 | 12/2004 | Cheng | 463/35 |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0102374 A1 | 5/2005 | Moragne et al. | 709/217 |
| 2005/0105777 A1 | 5/2005 | Kozlowski et al. | 382/115 |
| 2005/0117045 A1 | 6/2005 | Abdellatif et al. | 384/335 |
| 2005/0198095 A1 | 9/2005 | Du et al. | 709/200 |
| 2005/0208999 A1 | 9/2005 | Cheng et al. | 463/37 |
| 2005/0226431 A1 | 10/2005 | Mao | 381/61 |
| 2005/0239548 A1 | 10/2005 | Ueshima et al. | 463/36 |
| 2006/0033713 A1 | 2/2006 | Pryor | 345/158 |
| 2006/0035710 A1 | 2/2006 | Festejo et al. | 463/36 |
| 2006/0038819 A1 | 2/2006 | Festejo et al. | 345/530 |
| 2006/0204012 A1 | 9/2006 | Marks et al. | 381/26 |
| 2006/0233389 A1 | 10/2006 | Mao et al. | 381/92 |
| 2006/0247046 A1 | 11/2006 | Choi et al. | |
| 2006/0250681 A1 | 11/2006 | Zalewski et al. | 345/156 |
| 2006/0252541 A1 | 11/2006 | Zalewski et al. | 463/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 381/334 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1* | 12/2006 | Mao et al. | 463/37 |
| 2006/0287086 A1 | 12/2006 | Zalewski et al. | 436/2 |
| 2006/0287087 A1 | 12/2006 | Zalewski et al. | 463/37 |
| 2007/0015559 A1 | 1/2007 | Zalewski et al. | 463/1 |
| 2007/0021208 A1 | 1/2007 | Mao et al. | 463/36 |
| 2007/0025562 A1 | 2/2007 | Zalewski et al. | 381/92 |
| 2007/0060336 A1 | 3/2007 | Marks et al. | 463/30 |
| 2007/0061413 A1 | 3/2007 | Larsen et al. | 709/217 |
| 2007/0066394 A1 | 3/2007 | Ikeda et al. | 463/37 |
| 2007/0072675 A1 | 3/2007 | Hamano et al. | 463/42 |
| 2007/0120834 A1 | 5/2007 | Boillot | 354/103 |
| 2007/0120996 A1 | 5/2007 | Boillot | 384/345 |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2007/0270222 A1* | 11/2007 | Yamanaka et al. | 463/37 |
| 2008/0015031 A1 | 1/2008 | Koizumi et al. | |
| 2008/0056561 A1 | 3/2008 | Sawachi | 382/154 |
| 2008/0070684 A1 | 3/2008 | Haigh-Hutchinson | 463/32 |
| 2008/0076567 A1* | 3/2008 | Dohta | 463/37 |
| 2008/0091421 A1 | 4/2008 | Gustavsson | 704/233 |
| 2008/0225000 A1* | 9/2008 | Bellwood et al. | 345/158 |
| 2009/0010494 A1 | 1/2009 | Bechtel et al. | 382/104 |
| 2009/0016642 A1 | 1/2009 | Hart | 382/278 |
| 2009/0147991 A1 | 6/2009 | Chau | 382/107 |
| 2009/0221368 A1 | 9/2009 | Yen et al. | 463/32 |
| 2009/0221374 A1* | 9/2009 | Yen et al. | 463/42 |
| 2009/0288064 A1 | 11/2009 | Yen et al. | 717/106 |
| 2010/0004896 A1 | 1/2010 | Yen et al. | 702/153 |
| 2010/0137064 A1 | 6/2010 | Shum et al. | 463/36 |
| 2011/0009194 A1* | 1/2011 | Gabai et al. | 463/36 |

FOREIGN PATENT DOCUMENTS

| | | |
|---|---|---|
| EP | 0652686 | 5/1995 |
| EP | 0750202 | 12/1996 |
| EP | 0835676 | 4/1998 |
| EP | 1098686 | 5/2003 |
| EP | 1435258 | 7/2004 |
| FR | 2814965 | 4/2002 |
| GB | 2206716 | 1/1989 |
| GB | 2206716 | 11/1989 |
| GB | 2376397 | 11/2002 |
| GB | 2388418 | 11/2003 |
| JP | 01-284897 | 11/1989 |
| JP | 06-102980 | 4/1994 |
| JP | 07-311568 | 11/1995 |
| JP | 9-128141 | 5/1997 |
| JP | 9-185456 | 7/1997 |
| JP | 11-38949 | 2/1999 |
| JP | 2000-172431 | 6/2000 |
| JP | 2000259856 | 9/2000 |
| JP | 2000350859 | 12/2000 |
| JP | 2001-166676 | 6/2001 |
| JP | 2002369969 | 12/2002 |
| JP | 2004-145448 | 5/2004 |
| JP | 2004145448 | 5/2004 |

| | | |
|---|---|---|
| JP | 2005-046422 | 2/2005 |
| WO | WO 88/05942 | 8/1988 |
| WO | WO 98/48571 | 10/1998 |
| WO | WO 99/35633 | 7/1999 |
| WO | WO 99/26198 | 10/1999 |
| WO | WO 02/27456 | 2/2002 |
| WO | WO 03/079179 | 9/2003 |
| WO | WO 2005/073838 | 8/2005 |
| WO | WO 2005107911 | 11/2005 |
| WO | WO 2007095082 | 8/2007 |
| WO | WO 2008/056180 | 5/2008 |

OTHER PUBLICATIONS

Ephraim et al. "Speech Enhancement Using a Minimum Mean—Square Error Short—Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

"The Tracking Cube: A Three-Dimentional Input Device", IBM Technical Disclosure Bulletin, Aug. 1, 1989, pp. 91-95, No. 3B, IBM Corp.New York, U.S.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . .)", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View",Sep. 9, 1991, Systems and Computers in Japan.

Lanier, Jaron, "Virtually there: three-dimensional tele-immersion may eventually bring the world to your desk", Scientific American, ISSN: 0036-8733, Year: 2001.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS&T, pp. 564-574 (031).

* cited by examiner

BASE STATION MOVEMENT DETECTION AND COMPENSATION

CROSS REFERENCE TO RELATED APPLICATIONS

The present application is related to U.S. patent application Ser. No. 12/463,359, entitled "BASE STATION FOR POSITION LOCATION", filed on the same date as the instant application and, U.S. patent application Ser. No. 12/145,455, entitled "DETERMINATION OF CONTROLLER THREE-DIMENSIONAL LOCATION USING IMAGE ANALYSIS AND ULTRASONIC COMMUNICATION", filed on Jun. 24, 2008, each of which is herein incorporated by reference.

BACKGROUND

DESCRIPTION OF THE RELATED ART

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera that tracks an object.

However, placement of the video camera and other electronic devices to track user input can be difficult. With larger televisions and monitors, users are required to stand further away from the television to take in the entire picture. As consoles are generally located close to the television, this can lead to decreased sensor performance. Similarly, video cameras for tracking and depth sensing can have decreased performance as users move further from the camera.

It is within this context that embodiments of the invention arise.

SUMMARY OF THE INVENTION

Broadly speaking, the present invention provides near real-time compensation for movement of a base station that is used to transmit user input to a game console. In some embodiments, the base station is further configured to capture and process image data in order to extract depth data regarding the position of controllers associated with the game console.

Methods for processing interactive communication received from input devices, which interface with a computer program that executes at a computer, are provided. A method includes receiving input data from a first input device and a second input device at a base station that is interfaced with the computer. The first and second input devices are movable independently of one another to interactively interface with the computer program. The method tracks a position of the first and second input devices through the base station and identifies a near-identical change in position of the tracked position of the first and second input devices. The method then sets a flag upon identifying the near-identical change in position. The flag is processed by the computer program to set an action to take during interactivity with the computer program. In one example, the base station includes an inertial sensor that can confirm movement. If movement is confirmed, the flag is processed to take the action, as defined within the computer program.

In one embodiment a method for detecting interactive communication when interfacing with a computer game that is executed at a game console and displayed on a screen is disclosed. The method includes an operation that receives input and position from a first input device and a second input device. The first and second input devices being moved independently by respective first and second users to interactively interface with the computer game. Wherein a base station receives the input and position from the first and second input devices and wirelessly interfaces the input and position to the game console. The method further including an operation to correct the position of both the first and second input devices as shown on the screen that displays the interaction of the computer game if a near-identical change in the position of both the first and second input devices is detected.

In another embodiment a system to provide interactive control of a video game, is disclosed. The system includes a game console and a base station that is positioned at a location that is spaced apart from the game console. The base station has communications circuitry that enables an interface between the base station and the game console. The base station further has a video camera to capture image data within a zone of play. The system further includes a controller that is interfaced with one or both the base station and the game console. Wherein analysis of image data that includes the controller is used to determine movement of the controller within the zone of play. The movement of the controller being correlated to interactive control of the video game by the game console.

In still another embodiment, a system to interface with a game console to control a video game is disclosed. The system includes a game console and a base station that is interfaced with the game console. The base station further includes processing circuitry that is configured to send and receive data between the base station and the game console. The base station is further configured to process position data. The system further includes a controller that is interfaced with the base station. The controller includes hardware detect movement data of the controller and communicate the movement data to the base station. The base station processing the position data of the controller, the position data being relayed from the base station to the game console to determine a relative position of the controller to the base station, wherein changes in the relative position of the controller facilitate interactive control with the video game.

BRIEF DESCRIPTION OF THE DRAWINGS

The invention, together with further advantages thereof, may best be understood by reference to the following description taken in conjunction with the accompanying drawings.

FIGS. 3B-1, 3B-2, 3B-3, 3B-4, and 3B-5 illustrate alternate embodiments of base stations with multiple camera locations, in accordance with embodiments of the present invention.

FIG. 4 is an exemplary top view of a screen in accordance with one embodiment of the present invention.

FIG. 5 shows the conversion from a distance measurement to an absolute depth measurement in accordance with one embodiment of the present invention.

FIG. 6C illustrates interactive control of a video game while

DETAILED DESCRIPTION

Method and systems for processing interactive communication from input devices, which interface with a computer program, are disclosed. The method includes receiving input data from a first input device and a second input device at a base station that is interfaced with the computer. The base station may be wired or wireless. The input devices may be held by one user, where one input device is held in each hand, or one input device can be held by two or more separate users. The first and second input devices are movable independently of one another to interactively interface with the computer program.

In one embodiment, the computer program is a computer game, but in other embodiments, the computer program maybe a general office programs, entertainment programs or special purpose programs. In accordance with the defined embodiments, the method tracks a position of the first and second input devices through the base station. For instance, the input devices communicate with the base station to either provide their position or provide data to ascertain their position. The processing of the input device positions can also occur at the computer (e.g., game console), upon receiving the position data from the base station, which in turn, received the data from the input devices. In either embodiment, the tracking of position is necessary to identifies a near-identical change in position of the tracked position of the first and second input devices.

The method is configured to set a flag upon identifying the near-identical change in position. The flag is processed by the computer program to set an action to take during interactivity with the computer program. In one example, the base station includes an inertial sensor that can confirm movement. If movement is confirmed, the flag is processed to take the action, as defined within the computer program (or game program).

In other embodiments, a camera is provided inside of the base station, to capture image data, which in turn is used to identify the position of the input devices. In still other embodiments, ultrasonic communication between the input devices and the base station is used to determine position of the input devices. The various examples will now be described with reference to the drawings.

Figure 1:
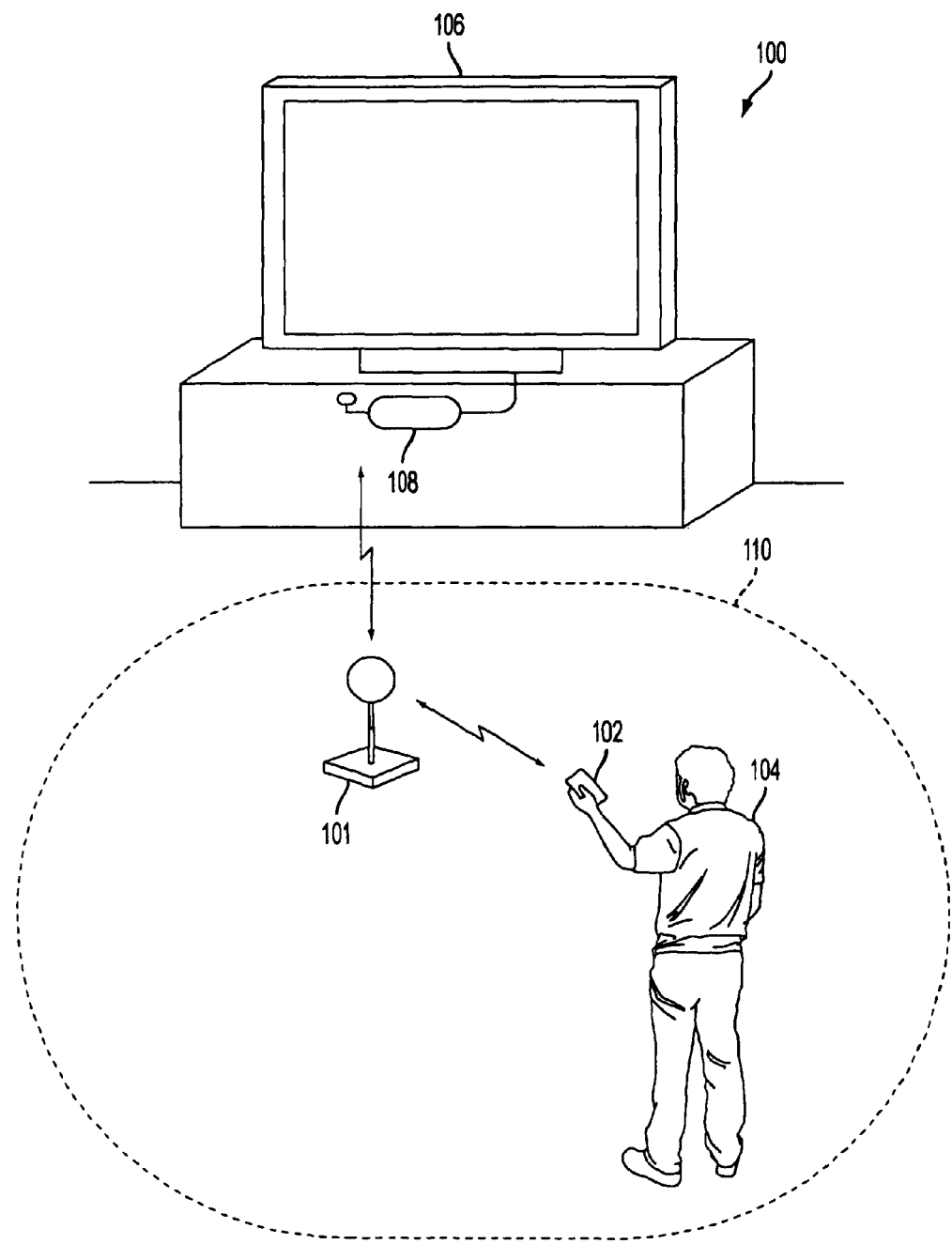
FIG. 1 is an exemplary illustration of a scene that includes a base station, a user manipulating a controller along with a game console and a monitor, in accordance with one embodiment of the present invention.

FIG. 1 is an exemplary illustration of a scene 100 that includes a base station 101, a user 104 manipulating a controller 102 along with a game console 108 and a monitor 106, in accordance with one embodiment of the present invention. The monitor 106 displays video output from the game console 108. The user 104 interacts with the game console 108 via video displayed on the monitor 106 using the controller 102 and the base station 101. In one embodiment, the monitor 106 is a television that is also capable of reproducing audio output from the game console 108. In other embodiments, audio output from the game console 108 is reproduced using multiple speakers to create an immersive multimedia experience. The base station 101 provides communication between the game console 108 and the controller 102 with a zone of play 110.

The use of the base station defines a zone of play 110 away from the console 108. Some of the advantages of establishing the zone of play 110 away from the console 108 include, but are not limited to bringing sensors within the base station 101 close to the user 104. The base station provides a mobile platform for sensors that can transmit and send data to and from the controllers that can be moved throughout the scene 100. The mobility of the base station allows sensors to be moved away from the console and closer to users and the associated controllers. The closer proximity of the base station to the controllers allows for both improved detection of controller movement and increased interactivity. In one embodiment, the base station provides visual and audible feedback to the user 104 and also is used to determine the location of the controller 102 within the scene 100.

In one embodiment, the controller 102 communicates with the base station 101 using a radio communication protocol such as, but not limited to Bluetooth or one of the protocols defined within the IEEE 802.11 specification. In another embodiments, communication between the base station 101 and the controller 102 is performed using infrared light or combinations of infrared light and radio communication protocols. While FIG. 1A shows just the single user 104 with the controller 102, the base station 101 is capable of receiving and processing user input from multiple controllers from multiple users. The base station 101 can use similar wireless communication protocols to communicate with the game console 108. Additionally, in some embodiments, communication between the base station 101 and the game console 108 can be achieved using a wired connection.

With some embodiments, user 104 input to the controller 102 is received by the base station 101. Computer hardware within the base station processes the user input before the user input is relayed to the game console 108. In other embodiments, the base station 101 does not include computer hardware and the user input is relayed from the base station 101 to the game console 108. In other embodiments, the base station 101 includes computer hardware that performs some processing of user input before relaying the user input to the game console 108. In one embodiment, the base station 101 can track the controller 102 within the scene 100.

Figure 2A:
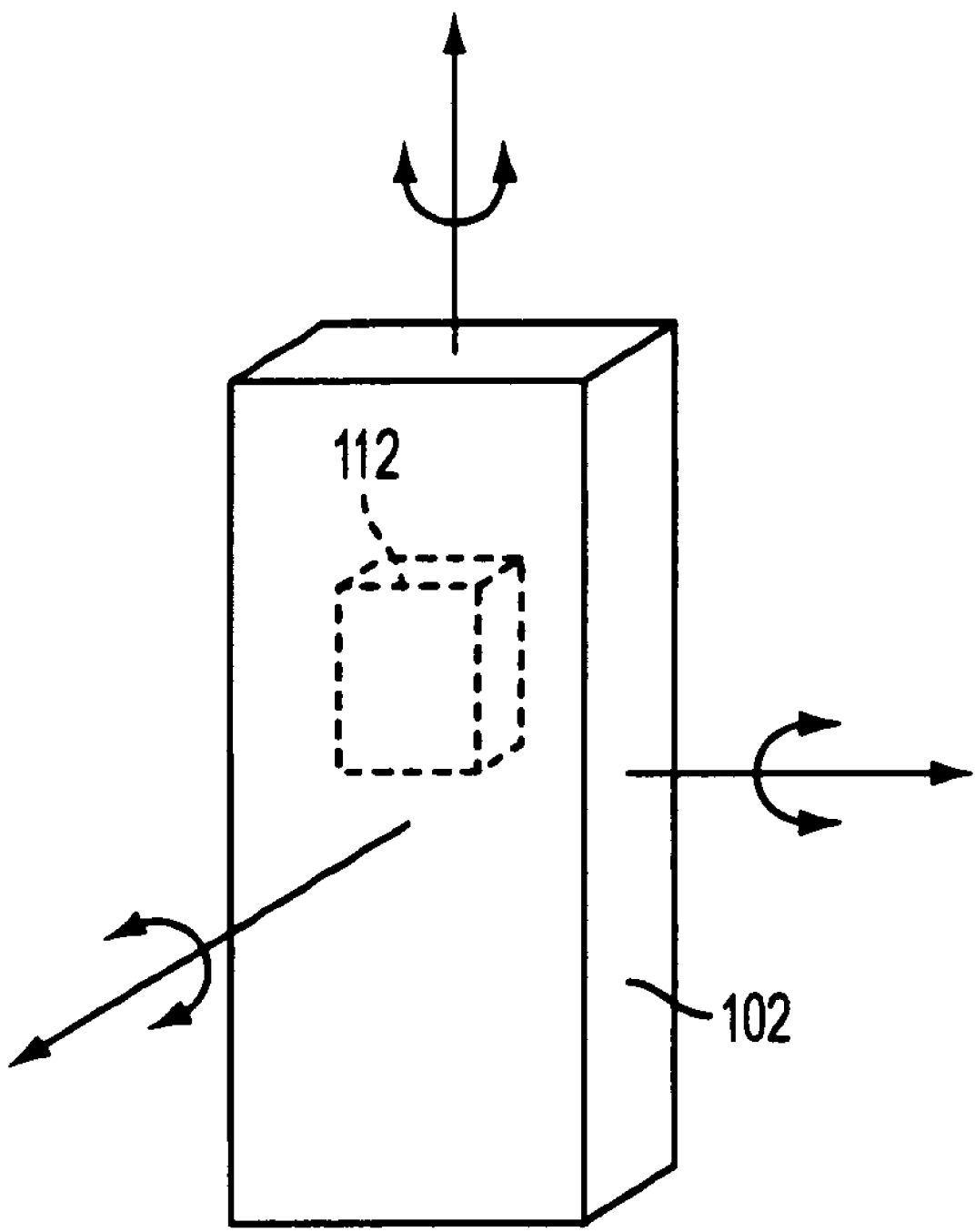
FIG. 2A is an exemplary simplified illustration of a controller, in accordance with one embodiment of the present invention.

FIG. 2A is an exemplary simplified illustration of a controller 102, in accordance with one embodiment of the present invention. The controller 102 includes hardware 112 associated with the controller 102. Movement of the controller within the scene is detected by the hardware 112. For example, in one embodiment translation of the controller 102 within three-dimensional space is detected by the hardware 112. Similarly, hardware 112 can also detect roll, pitch and yaw of the controller 102. In one embodiment, the hardware 112 includes three gyroscopes, three accelerometers and three magnetometers. In such an embodiment, the accelerometers provide the direction of gravity and that provides an absolute reference for pitch and roll. Similarly, the magnetometers provide an absolute reference for yaw.

Data collected from the combination of the gyroscopes, accelerometers and magnetometers allows the relative position of the controller 102 to be determined. In other embodiments of the controller 102, the hardware can utilize different combinations of sensors. The specific combination of gyroscopes, accelerometers and magnetometers discussed should not be construed as limiting as other combinations are possible. In the embodiment shown, hardware 112 is illustrated embedded or integrated within the controller 102. However, in other embodiments, the hardware 112 is added to an object using a modular attachment to enable motion detection of the object.

Figure 2B:
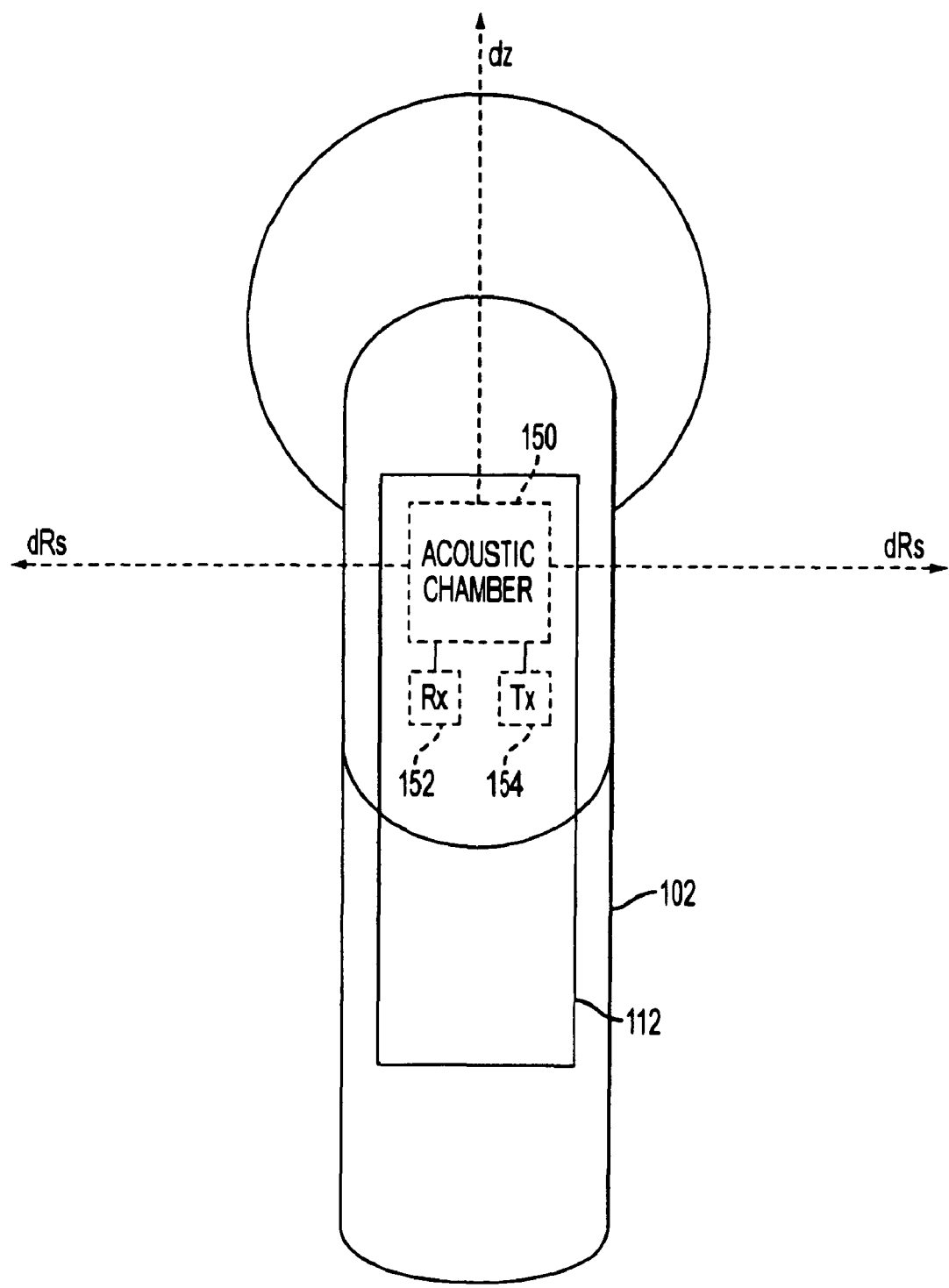
FIG. 2B is another exemplary illustration of a controller in accordance with one embodiment of the present invention.

FIG. 2B is another exemplary illustration of a controller 102 in accordance with one embodiment of the present invention. The controller 102 includes hardware 112 and further includes an ultrasonic acoustic chamber 150 along with ultrasonic transmitter 154 and ultrasonic receiver 152. The implementation of an ultrasonic transmitter and emitter enables additional positional location of the controller to be determined using ultrasonic echolocation. An embodiment of the controller 102 that implements ultrasonic emitters and receivers would be configured with appropriate exterior features to enable proper function of the emitters and receivers.

In each embodiment shown in FIG. 2A and FIG. 2B, the controller 102 further includes radio hardware to enable communications with the base station. The radio hardware allows the controller 102 to be associated with the base station. In embodiments where multiple controllers are associated with the base station, the various controllers can use different radio frequencies to ensure reliable communication with the base station. Other techniques can be used to differentiate signals from multiple controllers to the base station and the specific example provided should not be construed as limiting. The radio hardware also transmits data from the hardware 112 to the base station 101.

Figure 3A:
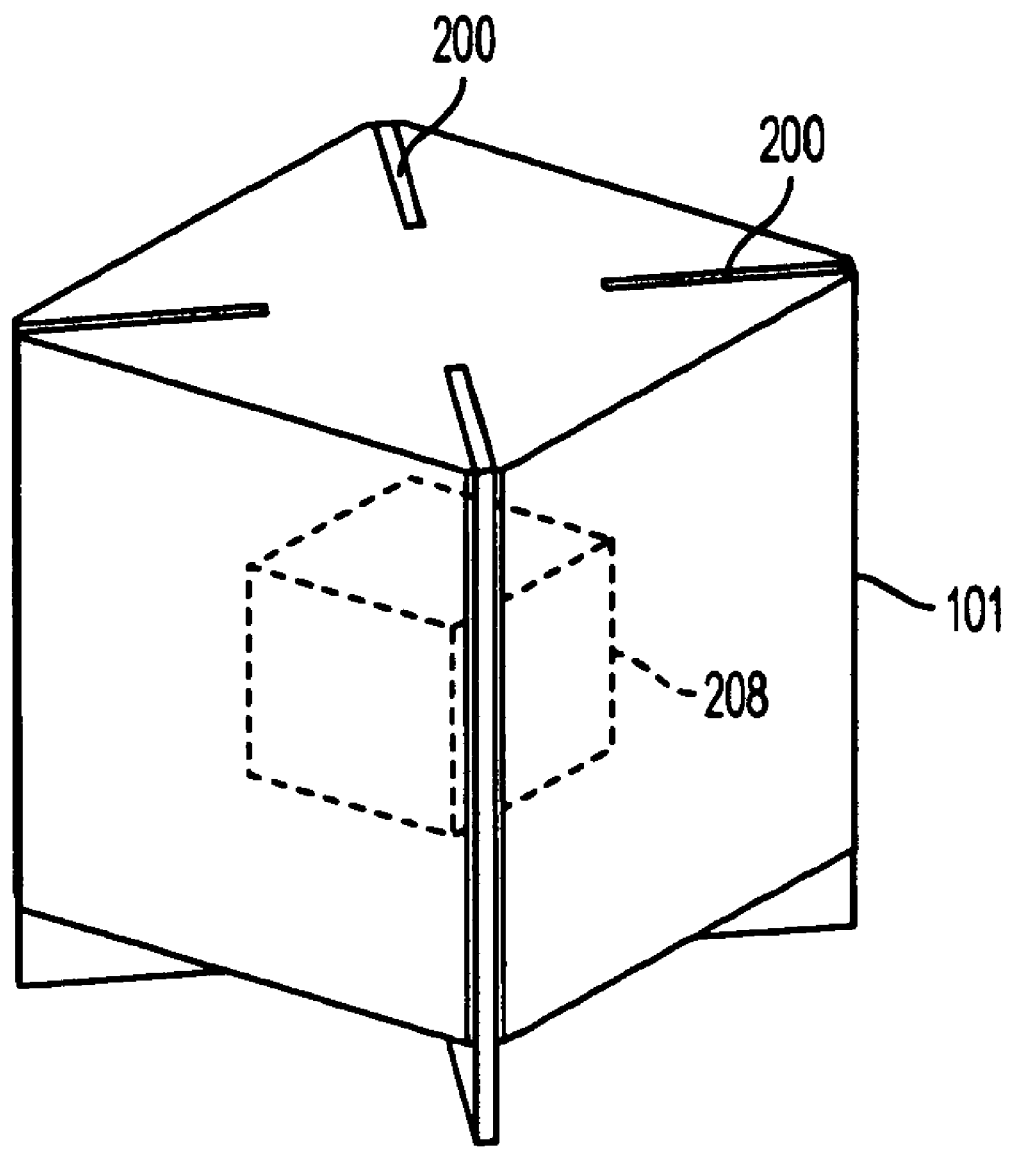
FIG. 3A and FIG. 3B are examples of a base station, in accordance with embodiments of the present invention.
Figure 3B:
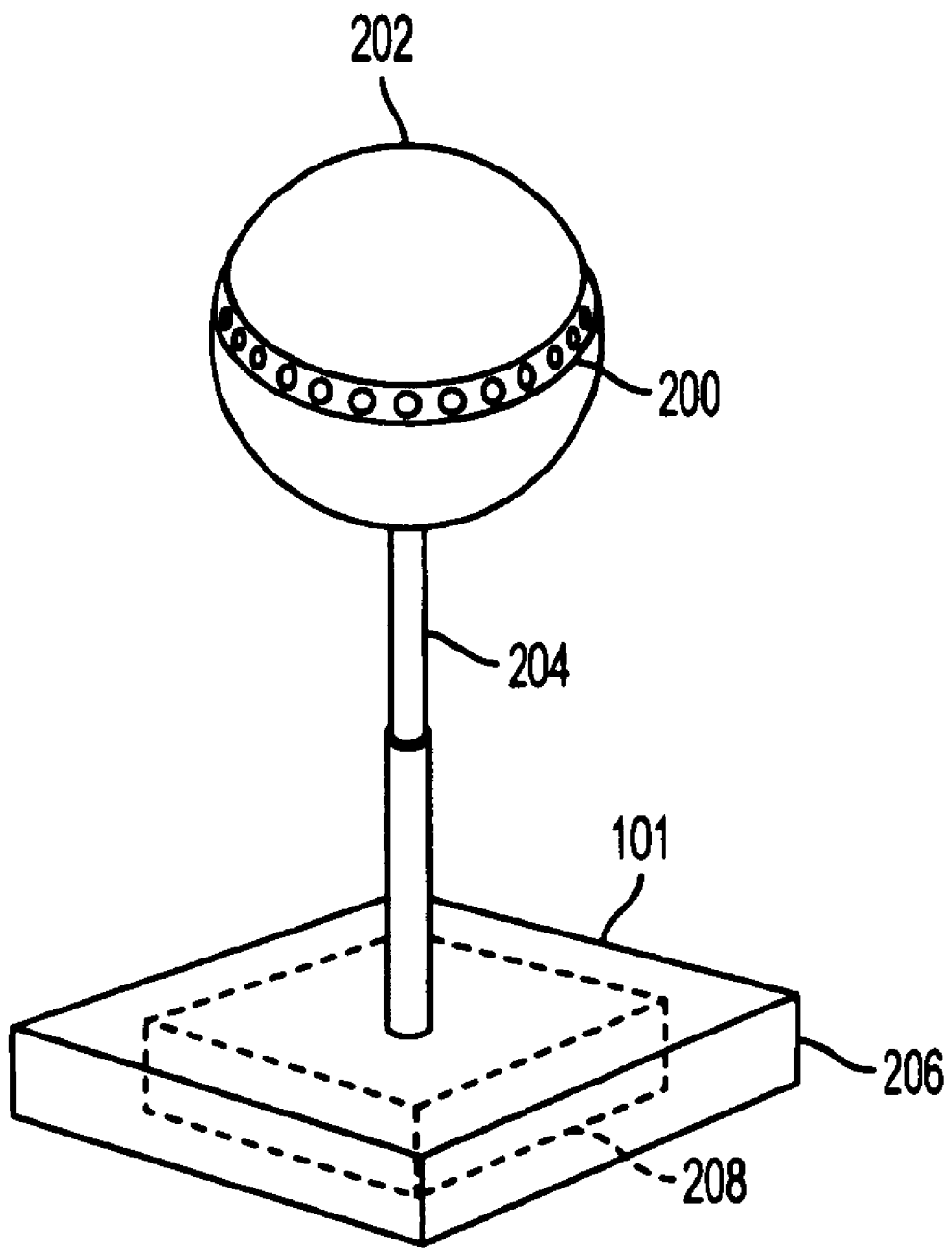
Figures 1, 3B:
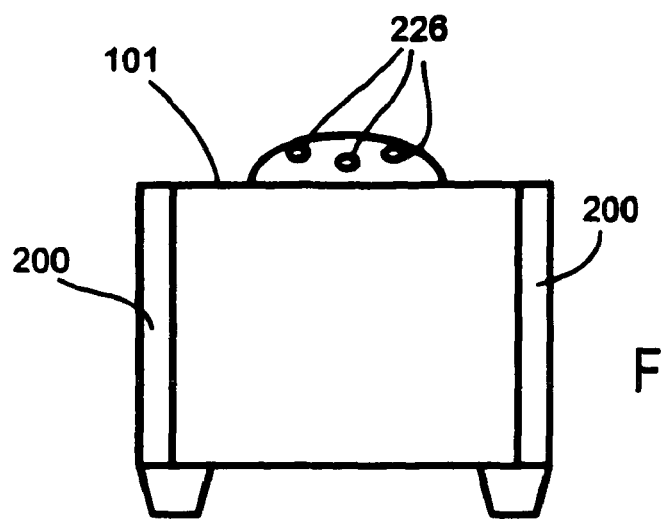

FIG. 3A and FIG. 3B are examples of a base station 101, in accordance with embodiments of the present invention. The base station 101 is a portable device associated with the game console that includes hardware or sensors to detect movement of the controllers. It is advantageous to include the motion detection hardware within the base station 101 because the hardware can be placed in closer proximity to users and their respective controllers. Game consoles are often placed on shelves or racks that can be relatively long distances from where users are manipulating controllers. Spacing apart the game console from the base station allows the motion detection sensors to be in closer proximity to the controllers. The closer proximity of the sensors to the controllers improves motion detection resolution and improved motion detection can improve user interactivity and provide a more fulfilling gaming experience. Additionally, with the base station spaced apart from the game console, the base station can function as another area where visual and audio feedback is provided to the user.

In FIG. 3A, the base station 101 is shown as a basic box with elements 200 at the corners. In such an embodiment, the base station 101 is placed on the floor or some surface between the game console and the user. In one embodiment, the elements 200 are made from materials such as frosted or clear glass, or translucent plastics. This allows the elements 200, in conjunction with lights, to act as a light pipe or a light tube in order to provide visual feedback to users. In other embodiments, the elements 200 are small backlit LCD arrays to provide visual feedback. In some embodiments, the combination of lights and elements 200 provide visual feedback based on events happening during game play. In other embodiments, the elements 200 provide visual feedback based on positions of a user relative to the base station. The embodiment illustrated in FIG. 3A should not be considered limiting as to the orientation or placement of elements 200. In other embodiments, elements 200 can form a ring around the base station. In still other embodiments, elements 200 can be arranged in patterns or the entire sides of the base station 101 can be an element 200.

FIG. 3B is another exemplary embodiment of the base station 101. This embodiment also includes element 200 to provide visual feedback to users. Element 200 is included on a sphere 202 that is mounted on an arm 204 mounted to a base 206. The embodiment illustrated in FIG. 3B should not be construed as limiting and the sphere 202 can be replaced with other three dimensional shapes. In various embodiments, the arm 204 can telescope so the height of the sphere 202 above the base 206 can be adjusted. The ability to adjust the height of the sphere 202 can assist in calibrating a reference plane. In other embodiments, the sphere 202 is mounted to the arm 204 on gimbals in order to allow a user to adjust the orientation of the sphere 202 on the end of the arm 204.

In embodiments of the base station 101 shown in FIG. 3A and FIG. 3B have circuitry within the base station 101 can establish a reference plane based on data from hardware that can include, but is not limited to, accelerometers, gyroscopes and magnetometers. With a reference plane, movement of the controllers can be determined relative to the reference plane based on data measurements from the hardware associated with each controller. In other embodiments of the base station 101, user interaction can help establish the reference plane using the lighting. For example, in embodiments that include the sphere 202, the height and orientation of the sphere 202 can be used to establish a reference plane that can be used to determine the relative location of the controllers associated with the base station.

Figures 2, 3B:
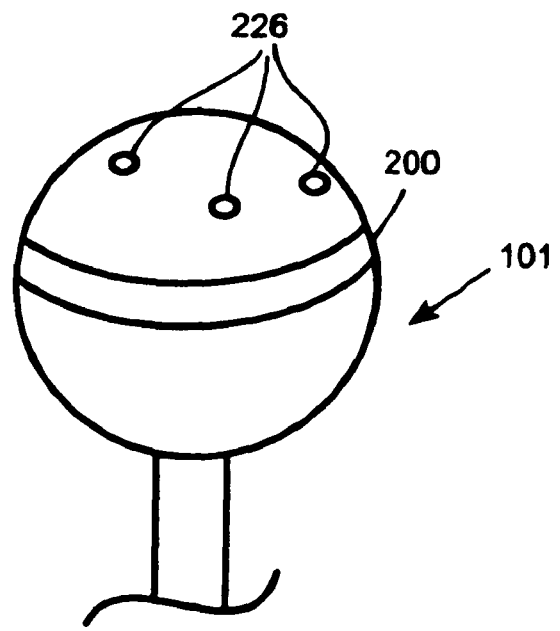
Figures 3, 3B:
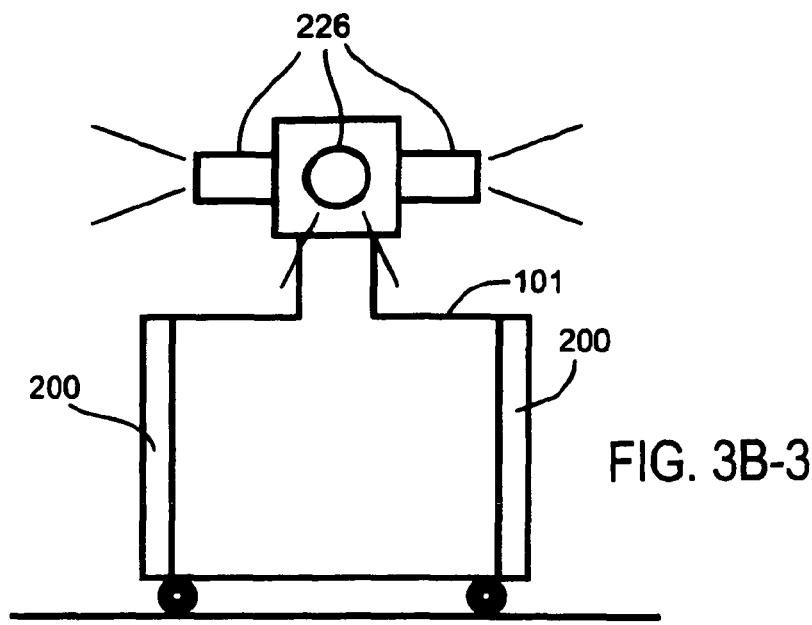

Referring to FIG. 3A and FIG. 3B, in both illustrated embodiments of the base station 101, the elements 200 can include a camera or cameras that capture images of a controller or controllers within a zone of play to assist in determining relative motion of the controller or the controllers. The integration of a camera or cameras within the base station 101 is not restricted to being within the elements 200. FIGS. 3B-1 and 3B-2 illustrate alternate embodiments of base stations with multiple camera locations, in accordance with embodiments of the present invention. FIG. 3B-1 includes cameras 226 placed in a dome on top of a base station 101. The cameras 226 are spaced at intervals to capture image data around the entire base station 101. In FIG. 3B-2, the cameras 226 are shown installed in an area outside of the elements 200. FIGS. 3B-3, 3B-4 and 3B-5 are alternative embodiments of the base station 101 that illustrate various locations for cameras 226 that are not within the elements 200.

Additionally, in the embodiment shown in FIG. 3B, adjusting the height of the sphere 202 can enable the camera or cameras mounted within the base station 101 to be positioned to monitor the zone of play. The base station 101 also includes base station hardware 208 that includes additional sensors and processors to effectuate operation of the base station.

Figures 3, 3B, 4:
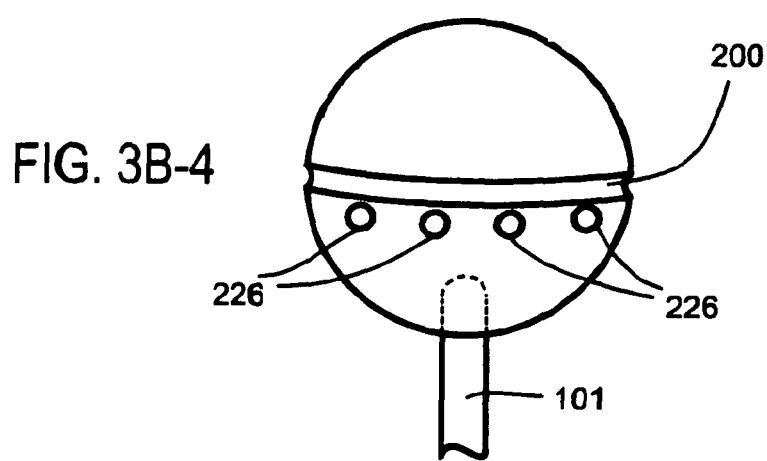
Figures 3, 3B, 4, 5:
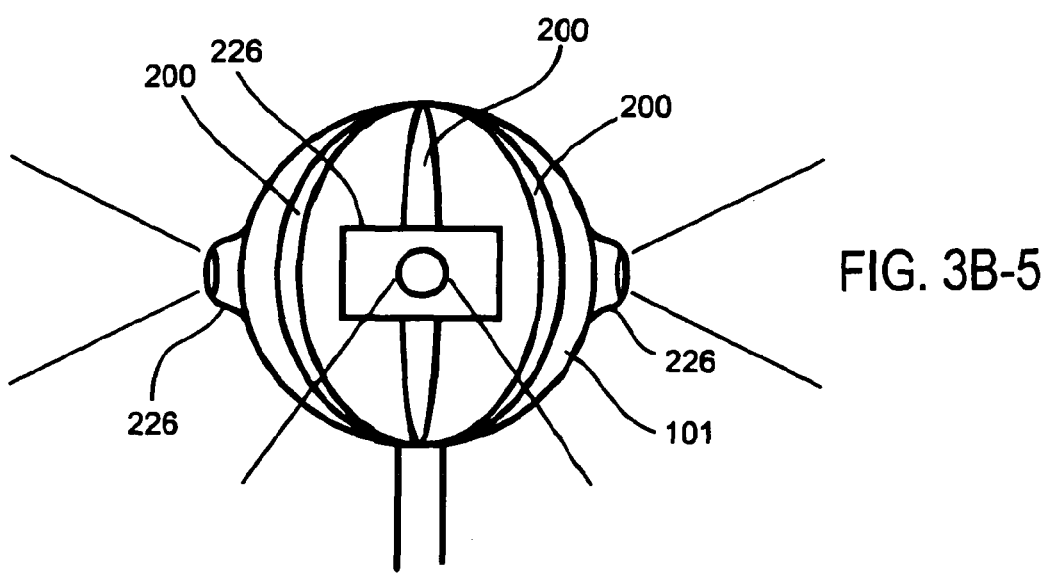
Figure 3C:
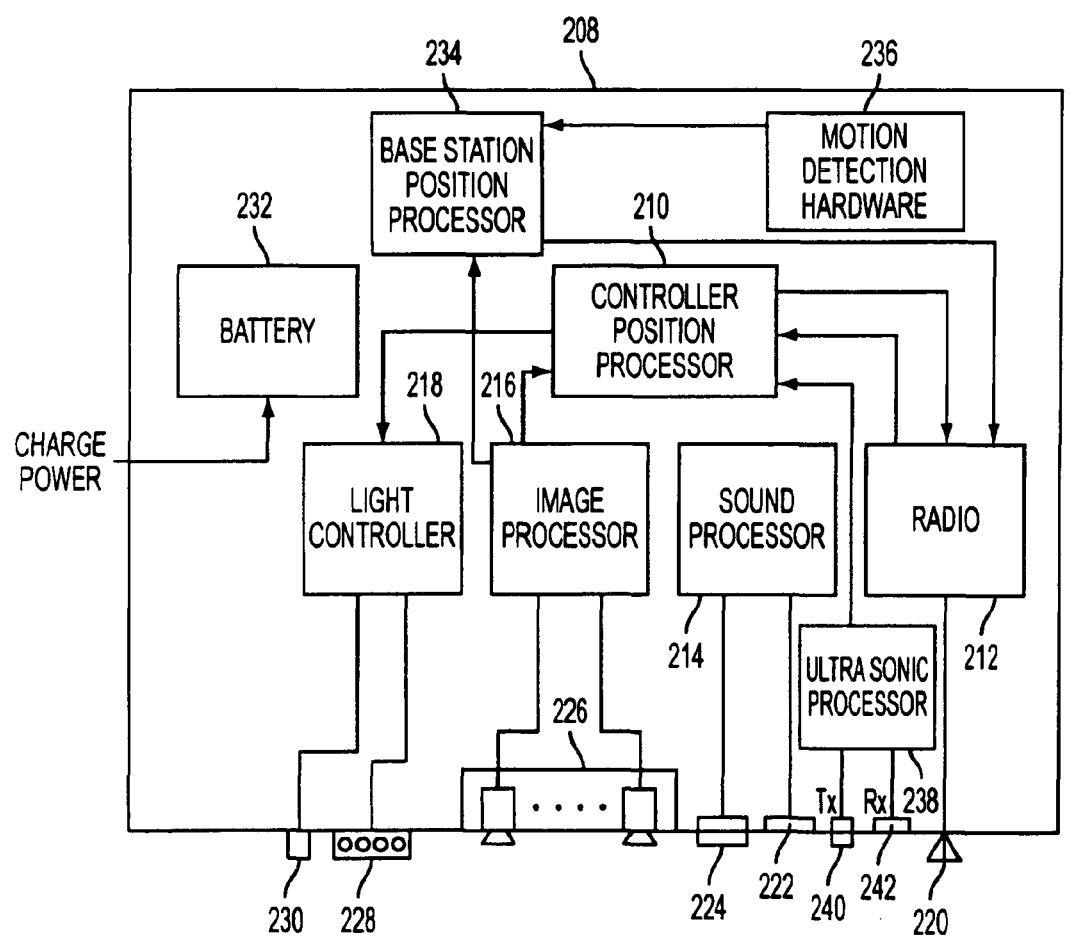
FIG. 3C is an exemplary illustration of base station hardware, in accordance with one embodiment of the present invention.
Figure 4:
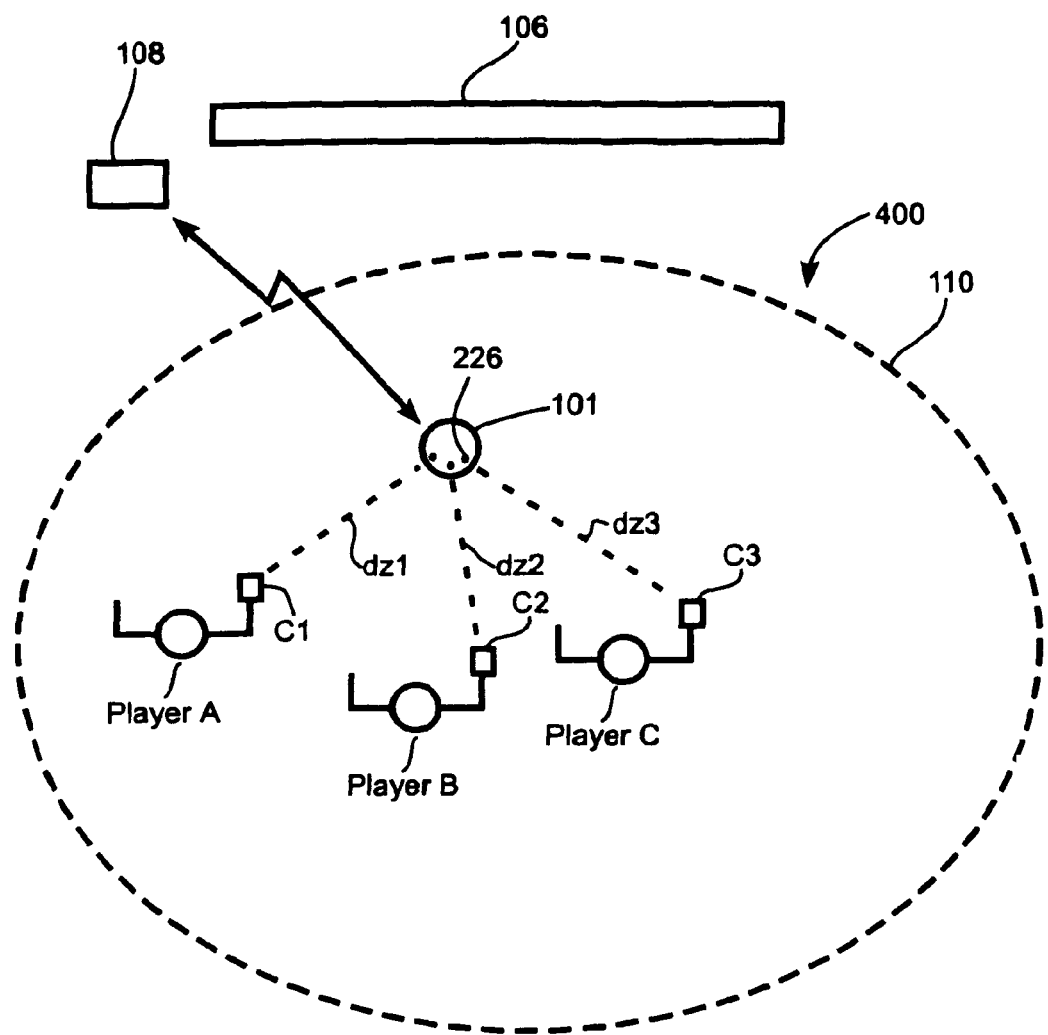
Figure 5:
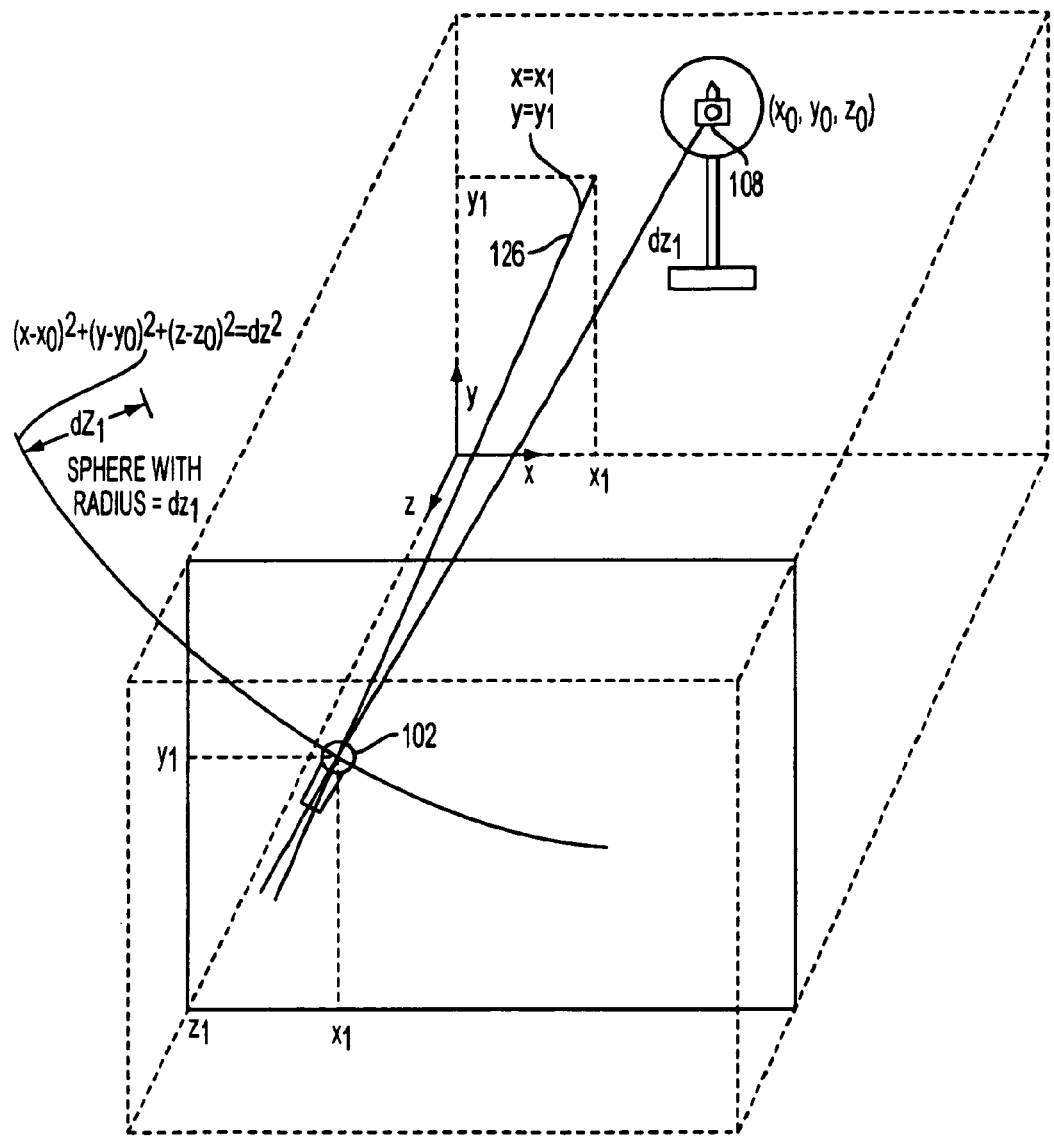

FIG. 3C is an exemplary illustration of base station hardware 208, in accordance with one embodiment of the present invention. The base station hardware 208 includes a battery 232, a controller position processor 210 that communicates with a radio 212, a sound processor 214, an image processor 216, an ultrasonic processor 238 coupled to an ultrasonic transmitter 240 and an ultrasonic receiver 242 and a light controller 218. The base station hardware 208 further includes a base station position processor 234 that communicates with motion detection hardware 236 and the radio 212.

The battery 232 is optional and is used in wireless embodiments of the base station. In other embodiments, the base station is tethered to the game console via a cable. The cable includes multiple conductors allowing the base station to communicate and draw electrical power from the game console. In one embodiment, the controller position processor 210 and base station position processor 234 are custom Application Specific Integrated Circuits (ASICs) while the sound processor 214, image processor 216, and ultrasonic processor 238 are Digital Signal Processors (DSPs).

The radio 212 is connected to an antenna 220 and in wireless embodiments of the base station, the radio 212 sends and receives data to and from the game console. The radio 212 is also configured to send data to any associated controllers and receive data from any associated controllers. The data that is received from the controllers includes data from the hardware. The controller data is sent to the controller position processor 210 and is used to help determine the position of the controller relative to the base station. In various embodiments, the radio 212 can include a single radio that relies on a standard wireless communications protocol such as Bluetooth. In other embodiments, the radio 212 can include multiple radios operating on different wireless communication protocols. For example, in wireless embodiments of the base station, wi-fi communications can be used between the base station and the game console while Bluetooth can be used between the base station and any associated controllers.

In some embodiments, the base station includes a speaker 224 and a microphone 222 that are connected to the sound processor. In other embodiments, the microphone 222 is representative of multiple microphones arranged in a microphone array. The use of an array of directional microphones can be used to assist in enhancing game play. Directional microphones combined with voice recognition software could enable users to issue vocal commands to control game play. The speaker 224 can be representative of multiple speakers housed within the base station. The speaker 224 enables the base station to provide audible feedback to users. Audible feedback can be provided based on in-game events or can include game console notifications. An example of in-game event audible feedback would be the sound of running water emanating from the base station as a player approaches an in game stream. An example of a game console notification would be the base station emitting an audible tone or vocal instruction that the controller batteries need to be replaced.

The light controller 218 receives data from the controller position processor 210 and provides visual feedback to users via light array 228 or light emitter 230. In one embodiment, the light array 228 is an array of Light Emitting Diodes (LEDs). In other embodiments, the light array 228 is a Liquid Crystal Display (LCD) or multiple LCDs. The light array 228 is capable of providing visual user feedback based on in-game events. An example of in-game visual feedback available using the light array 228 includes changing the color of the lights associated with a player. In another embodiment, the light array 228 can be used to convey game console status. An example of game console status could include a bar graph showing the performance of an Internet connection associated with the game console. Similarly, chat requests or email notifications can be displayed on the light array. The light array 228 of the base station is a preferred location to display game console status information as it may not be relevant to the game on the main display. Furthermore, as the base station can be positioned closer to the users, the light array may be more visible to the user than a small display directly mounted to the game console.

In still another embodiment, the light array 228 is used to convey controller status. An example of controller status includes visual notification that the batteries in a controller need to be replaced. Another example of controller status would be associating a color with a particular controller and moving the color on the light array 228 as the controller moves about the base station. For example, if two users are playing a game, the light controller can illuminate half of the light array 228 one color for the first user and a second color for the second user. Additionally, based on the data from the position processor, the half of the light array 228 illuminated for the first user can actually be the half on the side closest to the first user.

The image processor 216 processes image data from cameras 226. In order to obtain image data from around the base station, multiple cameras are mounted in various positions on the exterior of the base station. In some embodiments, the cameras 226 use wide-angle lenses to minimize the number of camera necessary to capture images within the zone of play. In one embodiment, the cameras 226 are depth cameras that capture depth data for objects within their field of view. The depth data and image data are processed by the image processor 216 and, in some embodiments, the processed image data is supplied to the controller position processor 210 to help determine the position of controllers relative to the base station.

Image processor data is also provided to the base station position processor 234 in order to determine if the base station has been jostled or moved. The motion detection hardware 236 provides additional data to the base station position processor 234 in order to determine relative motion of the base station. In one embodiment, the motion detection hardware includes accelerometers, gyroscopes and magnetometers. In one embodiment, base station movement is detected when the base station position processor 234 analyzes image data for identical shifts in objects. In one example, the base station position processor 234 receives data from the motion detection hardware 236. When data from the motion detection hardware exceeds a threshold value indicative of movement of the base station, the base station position processor 234 triggers analysis of image date from the image processor 216. After triggering analysis if image data, image data that preceded and followed the triggering event is analyzed for simultaneous shifts of elements within the image. Though not shown, the base station hardware includes memory that is used to store or buffer image data from the image processor. When the triggering even occurs, the buffered image data is accessed for analysis to determine if the base station was jostled or moved.

In one embodiment, the base station position processor 234 can use the relative location of multiple players within the zone of play. In such an embodiment, the relative location of the respective controllers for each player can be used to determine the simultaneous shift after the triggering event. In other embodiments, where there is only one player within the zone of play, the base station processor 234 may use the position of the controller along with visual data associated with an item outside the zone of play. In another embodiment where there is one player within the zone of play, the base station processor relies on data from the motion detection hardware and the image data of the sole user. The embodiments discussed above are not intended to be limiting and other embodiments can include methods to determine movement of the base station using both image data and motion detection data.

FIG. 4 is an exemplary top view of a screen 400 in accordance with one embodiment of the present invention. The scene includes the game console 108 that is executing an interactive computer program that is displayed on the display 106. Player A interacts with the computer program being executed by the game console 108 using controller C1. Similarly, Player B and Player C interact with the computer program using respective controller C2 and C3. In this embodiment, the base station 101, spaced apart from the game console 108, is relaying user input from the controllers C1, C2 and C3 to the game console 108. Additionally, cameras 226 within the base station 101 are capturing image data of Player A, Player B, and Player C along with their respective controllers C1, C2 and C3. In this embodiment, the image data captured from the base station is used to determine the distance distances $d_{z1}$, $d_{z2}$, and $d_{z3}$, from the respective controllers to the base station 101. In other embodiments, ultrasonic emissions emitted from the controllers are used to determine the distances $d_{z1}$, $d_{z2}$, and $d_{z3}$. In still further embodiments, $d_{z1}$, $d_{z2}$, and $d_{z3}$ are determined from a combination of ultrasonic emissions and depth data captured from the base station cameras. In still other embodiments, the controllers include a particular geometric shape that is identified from the image data. In one embodiment, the controllers have an integrated spheroid shape that is visible to the cameras 226. Thus, as the spheroid shape is moved closer to the camera, the circular pixel area within the image data captured by the cameras 226 will increase and vice versa.

In one embodiment, the captured image data is used to determine a two dimensional location of the controller. This location is identified by two coordinates x and y, (x, y), that define a point in a plane, or a line in a three-dimensional space such as the zone of play. Sometimes horizontal and vertical positions are used to refer to the x and y values. Additionally, other types of coordinates are used, such as an angle from origin and a vector value. Similarly within a three-dimensional space different systems of coordinates can be used to identify a point in space, such as x, y and z orthogonal coordinates, x and y coordinates plus a vector from origin, or two angles and a vector, etc.

The microphone on the base station 101 captures sound data within the zone of play. In one embodiment, one-way communication is used where the sound originating from the controllers C1, C2, and C3 is received by microphone. Ultrasonic communications avoid interfering with the player's experience. In one embodiment, the controllers include a speaker where the sound originates, and the sound capture device includes multiple microphones to detect sound within the zone of play. In one embodiment, the focus on the zone of play can be refined using filtering techniques to avoid capture of extraneous noises from outside the zone of play. Additionally, the microphones or microphones may filter frequencies not used in the ultrasonic communication to further reduce interferences from undesired sound sources. Still yet, sounds communications may have false readings due to the sound being reflected from surfaces near the playing area. In one embodiment, computing system 102 includes mechanisms to avoid false readings caused by sound reflections, such as directional filters, sound wave analysis, etc.

In another embodiment, the communication between controller and image capture device 106 is bi-directional, where either the controller or the sound device transmit or receive ultrasonic messages. Still yet, in another embodiment, the one-way communication flows in the opposite direction with an ultrasonic microphone in each controller and a sound emitting device located near the display.

The ultrasonic communication is used to measure the distance between the controller and the sound capture device, named $d_z$, by analyzing the time for the sound signal to reach its destination. Additionally, the phase coherence of the received signal can also be analyzed to better determine distance. When one-way ultrasound communication is used, precise clock synchronization is needed in order to perform accurate measurements of the time for the sound to travel from source to destination. The person skilled in the art will easily appreciate known ways of obtaining clock synchronization. For example, a WiFi™ channel between the controller and the computing device can be used to synchronize the clocks. U.S. Pat. No. 5,991,693 to Zalewski (incorporated herein by reference) provides a tracking mode utilized by the present invention.

The point (x,y) obtained based on the captured image data, together with the distance dz define a single point within the three-dimensional capture area. Sometimes dz is called the third dimension, as dz can be translated into a value within a z axis that is orthogonal to the x, and y axes previously described. The z measurement is referred to as the depth within the capture area.

FIG. 5 shows the conversion from a distance measurement to an absolute depth (z) measurement in accordance with one embodiment of the present invention. The distance from the controller 102 to the base station 101 with coordinates($x_0$, $y_0$, $z_0$) is $d_z$. Using image capture data, the horizontal ($x_1$) and vertical ($y_1$) coordinates of controller 102 are calculated (not shown). Calculating the $z_1$ value of controller 102 involves intersecting the line defined by any point with coordinates ($x_1$, $y_1$) in the three dimensional space with a sphere centered at the sound capture device and with radius $d_{z1}$. The line is defined by the equation statement $$\{x=x_1; y=y_1\}$$

This equation assumes a space without perspective distortion. Other embodiments compensate for possible distortion due to the perspective view from the image capture device. The sphere is defined by the equation $$(x-x_0)^2+(y-y_0)^2+(z-z_0)^2=d_{z1}^2$$

Substituting x for $x_1$ and y for $y_1$ in the sphere equation returns a z value corresponding to the depth value $z_1$. It should be noted that the equation would return two z values, but only one would be inside the zone of play.

The calculations discussed above disclose on method of determining depth values base on ultrasonic transmission. In other embodiments the image data captured by the cameras associated with the base station can be used to determine a distance, or depth, of the controller from the base station. For example, in embodiments of the base station that utilize multiple cameras, triangulation of the depth of the controller can be determined based on image data from at least two cameras. Alternatively, as previously discussed, depth data can also be determined from the relative number of pixels of a distinguishing object associated with a controller. In still another embodiment, the base station camera can by depth cameras. The embodiments described above are not intended to be limiting and various combinations of the embodiments can be used to determine the distance of a controller to the base station.

Figure 6A:
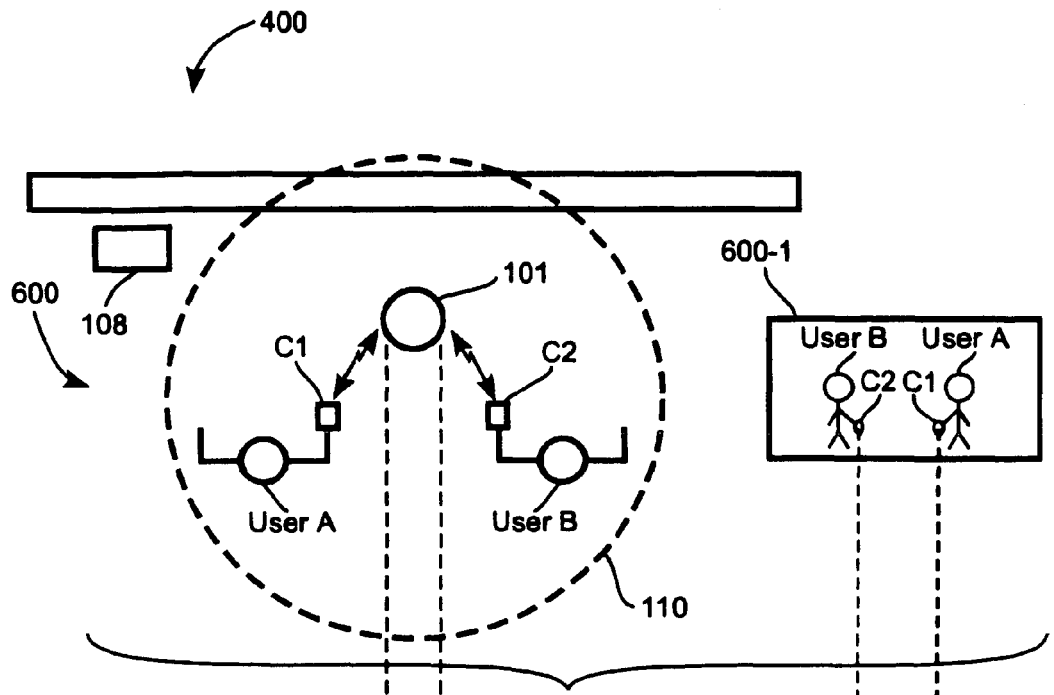
FIG. 6A and FIG. 6B illustrate how horizontal movement of the base station is detected, in accordance with one embodiment of the present invention.
Figure 6B:
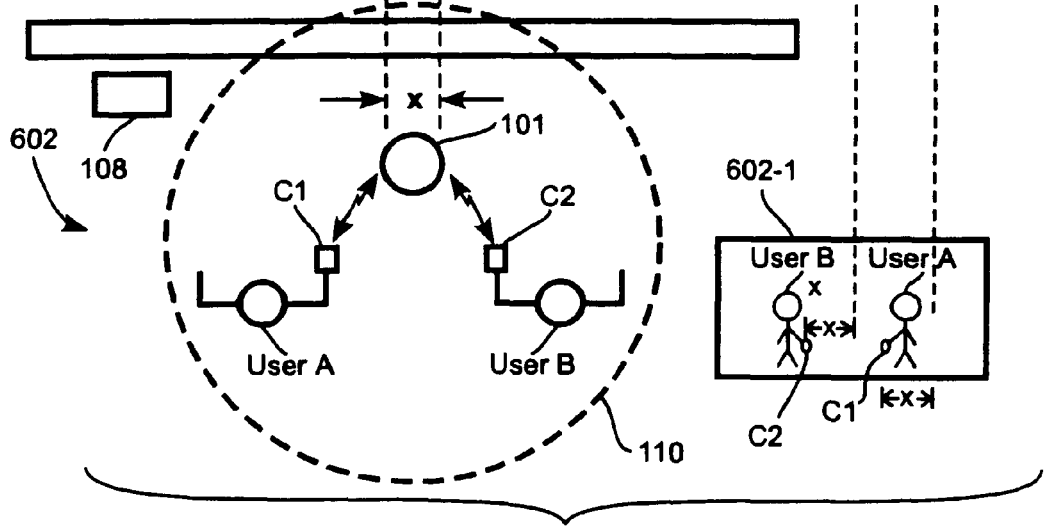

FIG. 6A and FIG. 6B illustrate how horizontal movement of the base station 101 is detected, in accordance with one embodiment of the present invention. FIG. 6A includes a top view of a scene 600 and base station view 600-1 of the scene 600. In the scene 600, the base station 101 is between the game console 108 and user A and user B. User A manipulates controller C1 while user B manipulates controller C2 to interact with a computer program being executed by the game console 108. In the base station view 600-1 the scene 600 is shown as captured by cameras associated with the base station 101. Accordingly, the positions of user A and user B are opposite the view in scene 600. While the base station view illustrated in FIG. 6A and FIG. 6B show an image of the user A and user B, additional cameras associated with the base station can capture additional depth depth data within the zone of play 110.

FIG. 6B illustrates a movement of the base station 101 from the location in FIG. 6A. As the base station 101 is a portable device that is placed relatively close to users of the game console, it is likely the base station will be jostled or accidentally moved (e.g., accidentally kicked). For example, causes of the movement of the base station 101 include, but are not limited to, rambunctious game play from either user A or user B, or a pet jostling the base station 101. As previously discussed, movement of the base station 101 can be detected using the motion detection hardware associated with the base station 101. Motion detection can be determined in a number of ways, such as by an accelerometer, an inertial sensor, a spatial tracking systems, etc.

As shown in FIG. 6B, the base station 101 has shifted to the right by a distance X. Accordingly, as shown in the base station view 602-1, captured image data of user A and user B shows a near-identical change in position of user A and user B. Though FIG. 6A and FIG. 6B are shown utilizing image data, other embodiments can detect near simultaneous shift for both users or two separate controllers (e.g., input devices).

In another embodiment, one user can be holding an input device in each hand, and thus, it may be necessary to determine if the base station was moved when the user was interfacing with the computer program. Thus, one method can include processing interactive communication received from input devices interfacing with a computer program, which is executed at a computer. The computer may be a single computer, a networked computer, a game console, networked game console, or a combination thereof. The method includes receiving input data from a first input device and a second input device at a base station that is interfaced with the computer. The first and second input devices are movable independently of one another to interactively interface with the computer program. The method tracks a position of the first and second input devices through the base station. It should be understood that tracking can be processed, in accordance with alternate embodiments.

Example embodiments include tracking the position of the first and second input devices by: (a) receiving position data from the first and second input devices, (b) calculating position data at the base station from data received from the first and second input devices, (c) calculating position data at the computer based on data received from the first and second input devices or the base station, (d) partially determining position at the first and second input devices and partially determining position at the base station; or (e) partially determining position data based on data obtained from the first and second input devices, the base station, and the computer. Depending on where the processing is done, the position processing can be done by one or more of image processing, ultrasonic data processing, input joy-stick movement, pitch-roll-yaw data, wired or wireless input, or input button selection.

The method is configured to identify a near-identical change in position of the tracked position of the first and second input devices. The near-identical change in position has a detectable magnitude. In accordance with this example method, a flag is set upon identifying the near-identical change in position. As used herein, a flag can be represented in a number of forms, such as code, a bit, a bit pattern, an exception, an object, code trigger, or the like. The form of the flag depends on the program or code receiving the flag. For instance, if the program is a computer game, the program instructions of the computer game can read the flag, and determine what should be processed in response to learning about the flag. In some cases, the flag may be communicated to other programs, either locally to the system or to remote systems or computers coupled via a network.

In one embodiment the flag is processed by the computer program to set an action to take during interactivity with the computer program. If the computer program is a computer game, the action to take can be one of subtracting out the near-identical change in position, applying a correction to both the first and second input devices, pausing the computer game, rewinding the computer game, restarting the computer game, or signaling movement of the base station.

If the computer program is other than a computer game, the actions can take on the form that is usual in the program's environment. For instance, if the user is interfacing with a browser, where the input devices are used to select text, the flag may cause the de-selection of text or revert the user to a state before the last interactive action was taken. The action to take during interactivity with the computer program is therefore preconfigured based on aspects of the computer program.

Still further, in one embodiment, if the magnitude by which the near-identical change in position occurs exceeding a threshold level, the system can be programmed to indicate that a movement in the base station may have occurred. In yet another embodiment, the base station itself can have circuitry and logic to determine if the base station moved. The determination can by way of motion detectors, inertial sensors, and the like, which are integrated within the base station.

Thus, the base station can be programmed to determine when movement occurs, and if it too has exceeded a magnitude. In certain embodiment, therefore, two different magnitudes can be checked, and two different threshold levels can be checked. Thus, it is possible to first determine if a near-identical change in position of the input devices occurred, and also check to see if the base station itself moved, before taking action on the flag.

In the various embodiments, the near-identical change in position can be subtracted from the user input in order to correct for the movement of the base station. In another embodiment, relying solely on simultaneous near-identical shifts of objects within the zone of play could lead to faulty determination of movement of the base station. Thus, in one embodiment, comparison of controller data for simultaneous shifts to detect movement of the base station is performed after the motion detection hardware has detected movement of the base station that exceeds a threshold value. Waiting to exceed a threshold value before examining controller data for near-identical changes in position is not necessary and should be considered optional.

When a near-identical shift of objects or controllers is detected within the zone of play, the base station can be recalibrated in real-time so as to minimize the impact on game play. In one embodiment the recalibration can occur in as few as two video frames, or a small number of video frames. As video is commonly displayed at about 30 frames per second, the recalibration period can be brief enough to be negligible or unnoticeable. Thus, if the base station detects that it has been shifted to the right, as shown in FIG. 6A and 6B, the base station will compensate by modifying the user input to controllers C1 and C2 so as to not interrupt game play.

FIG. 6A and FIG. 6B illustrate movement of the base station in a lateral direction relative to user A and user B. As noted above, these embodiments also apply to a single user, having one controller in each hand. Staying with the two user example, the base station can be moved or jostled closer to or farther from the user A and user B as well. In this situation, the depth data from either the optical depth cameras or the ultrasonic sensors can be used to determine the movement of the base station.

Figure 6C:
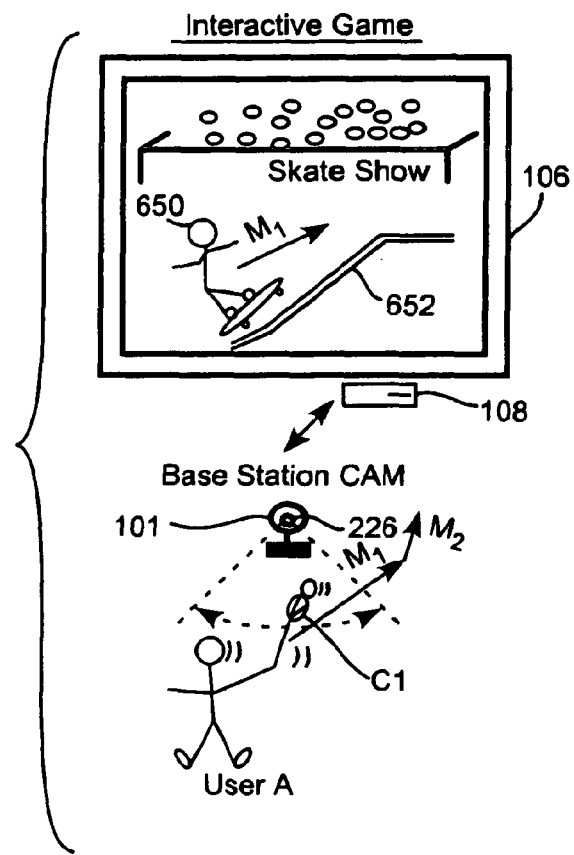
Figure 6D:
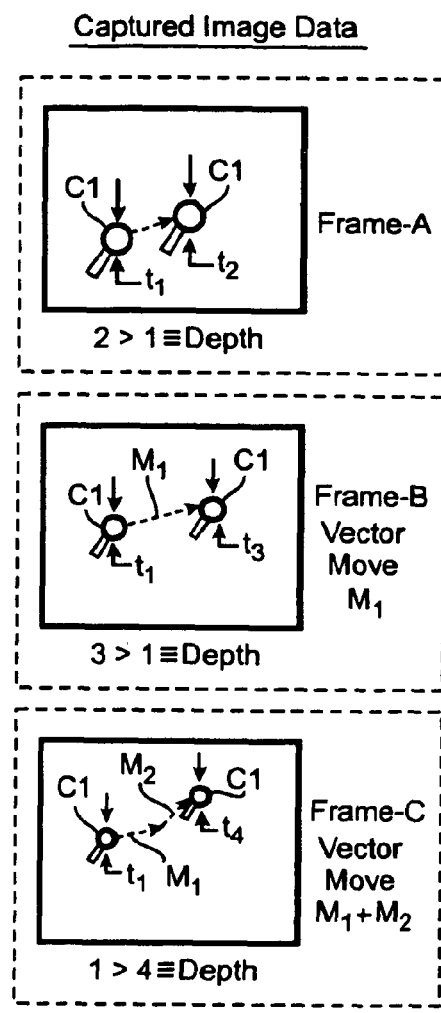
FIG. 6D illustrates image data captured of the interactive control using the cameras within the base station, in accordance with one embodiment of the present invention.

FIG. 6C illustrates interactive control of a video game while FIG. 6D illustrates image data captured of the interactive control using the cameras within the base station, in accordance with one embodiment of the present invention. In FIG. 6C user A manipulates controller C1 in movement M1 followed by movement M2 in order to control a skating avatar 650. The movements M1 and M2 are vectors as the movements include both a direction and magnitude. In this case, the magnitude for the movements is the speed in which the movement is completed. In this embodiment, the movement M1 is used to increase the speed of the skating avatar 650. Movement M2 is used to have the skating avatar 650 perform a jump at the top of the ramp 652. The game console 108 is rendering the game and output a video signal that is displayed on monitor 106.

Frame A of FIG. 6D illustrates intermediary image data captured controller C1 as movement M1 is performed. Two images of the controller C1 are shown, at time $t_1$ and at time $t_2$, where time $t_2$ is before the completion of movement M1. Analysis of the image reveals that the size of the controller C1 and time $t_2$ is larger than the size of the controller C1 at time $t_1$. This means that between time $t_1$ and $t_2$, the controller C1 was moved closer to the base station 101. Frame B illustrates the completion of movement M1 at time $t_3$. For clarity, frame B shows the controller C1 at time $t_1$ and $t_3$. In one embodiment, analysis of the image data, particularly the pixel data, can be used to determine if the controller C1 was moved closer or farther from the base station 101. When the controller C1 is composed of more pixels at time $t_3$ than at time $t_1$, the controller C1 was moved closer to the base station 101. When the controller C1 is composed of fewer pixels at time $t_3$, the controller C1 was moved away from the base station 101. Determining the relative change in distance toward the base station can be correlated to the change in speed of the skating avatar in FIG. 6C.

Frame C illustrates comparison of image data from time $t_1$ at the initiation of movement M1 and conclusion of movement M2 at $t_4$. Comparing the relative size of the controller C1 between time $t_1$, $t_2$, $t_3$, and $t_4$ in image data captured by cameras within the base station allows the game console to correlate movement of the controllers to interaction within the video game displayed on the monitor 106. The controls shown in FIG. 6C and FIG. 6D can be applied to any number of video games because user input based on image data and depth data allows vector movements within space to be mapped to any number of video game controls. For example, the controls can be used in boxing simulations, fishing simulations, or even throttle control for a driving simulation. The particular examples provided above should be considered exemplary and should not be considered limiting.

Figure 7:
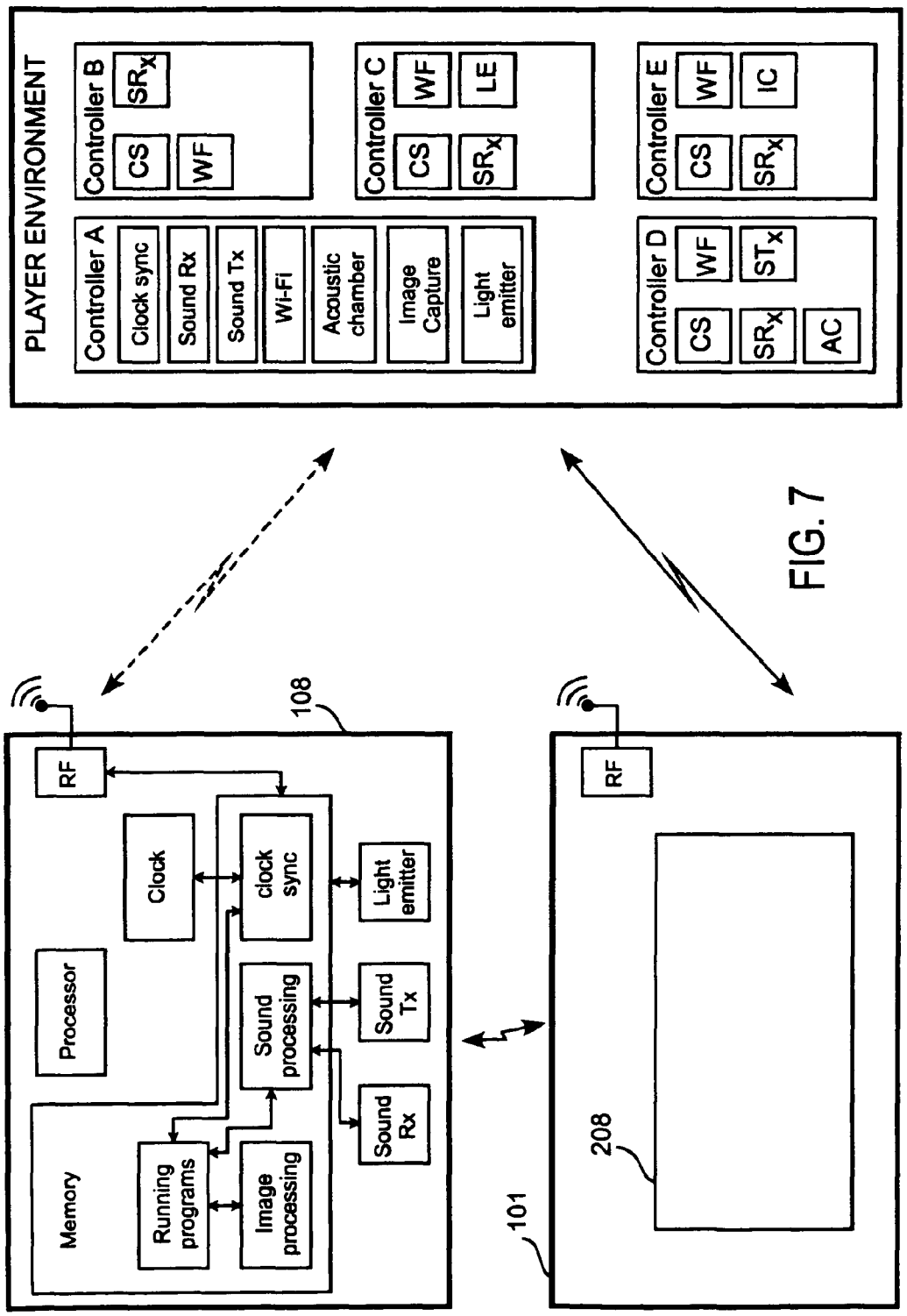
FIG. 7 is a block diagram of the different elements in the entertainment system in accordance with one embodiment of the present invention.

FIG. 7 is a block diagram of the game console 108, base station 101 and controller 102 in accordance with one embodiment of the present invention. In this embodiment and for simplicity the game console 108 is shown with a processor, a memory area, a clock, and communication interfaces. The communication interfaces include a radio-frequency (RF) interface for wireless communications to the base station and controllers. In other embodiments, the controllers are only in communication with the base station. In such an embodiment, the communications protocol between the base station and the game console can be Wi-Fi while communications between the controllers and the base station utilize Bluetooth protocols. As previously discussed, the base station can include other communications methods include image capturing, sound transmission and reception (ultrasonic in this embodiment), and light emitters.

The different communication protocols of the base station 101 connect to the respective controllers inside the computing system. The memory area includes running programs, an image processing area, a sound processing area, and a clock synchronization area. Running programs include a gaming program, image processing program, sound processing program, clock synchronization program, etc. These programs use the corresponding areas of memory, such as the image processing area containing image data, the sound processing area containing ultrasound communications data, and the clock synchronization area used for the synchronization with remote devices.

Several embodiments for controller configuration are shown in the player environment area. Controller A represents a "fully loaded" controller with many of the features previously described. Controller A includes a Clock Synchronization (CS) module used for clock synchronization with the game console 108; a Sound Receiver (SRx) for receiving ultrasonic data; a Sound Transmitter (SRx) for sending ultrasonic data; a WiFi (WF) module for WiFi communications with game console 108; an Acoustic Chamber (AC) for conducting sound to and from the front and/or the sides of the controller; an Image Capture (IC) device, such as a digital video camera, for capturing image data; and a Light Emitter (LE) in the infrared or visible spectrum for easier image recognition from the image processing module at game console 108.

Figure 8:
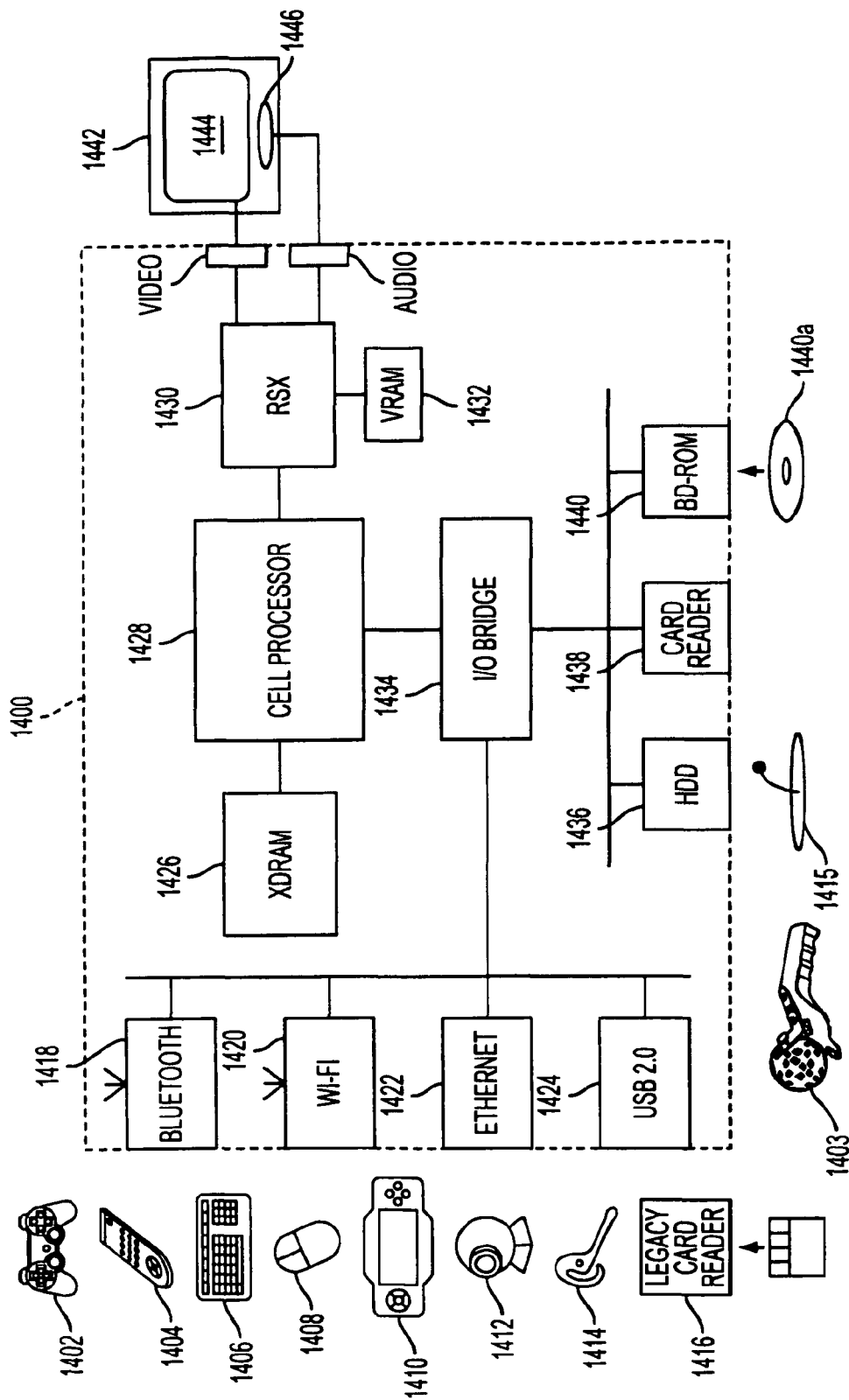
FIG. 8 illustrates hardware and user interfaces that may be used to determine controller location, in accordance with one embodiment of the present invention.

FIG. 8 illustrates hardware and user interfaces that may be used to determine controller location, in accordance with one embodiment of the present invention. FIG. 22 schematically illustrates the overall system architecture of the Sony® Playstation 3® entertainment device, a console that may be compatible for implementing a three-dimensional controller locating system in accordance with one embodiment of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

In the present embodiment, the game controllers 1402-1403 are operable to communicate wirelessly with the system unit 1400 via the Bluetooth link. However, the game controllers 1402-1403 can instead be connected to a USB port, thereby also providing power by which to charge the battery of the game controllers 1402-1403. Game controllers 1402-1403 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 1402 is a controller designed to be used with two hands and game controller 1403 is a single-hand controller as previously described in FIGS. 1-21. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 9:
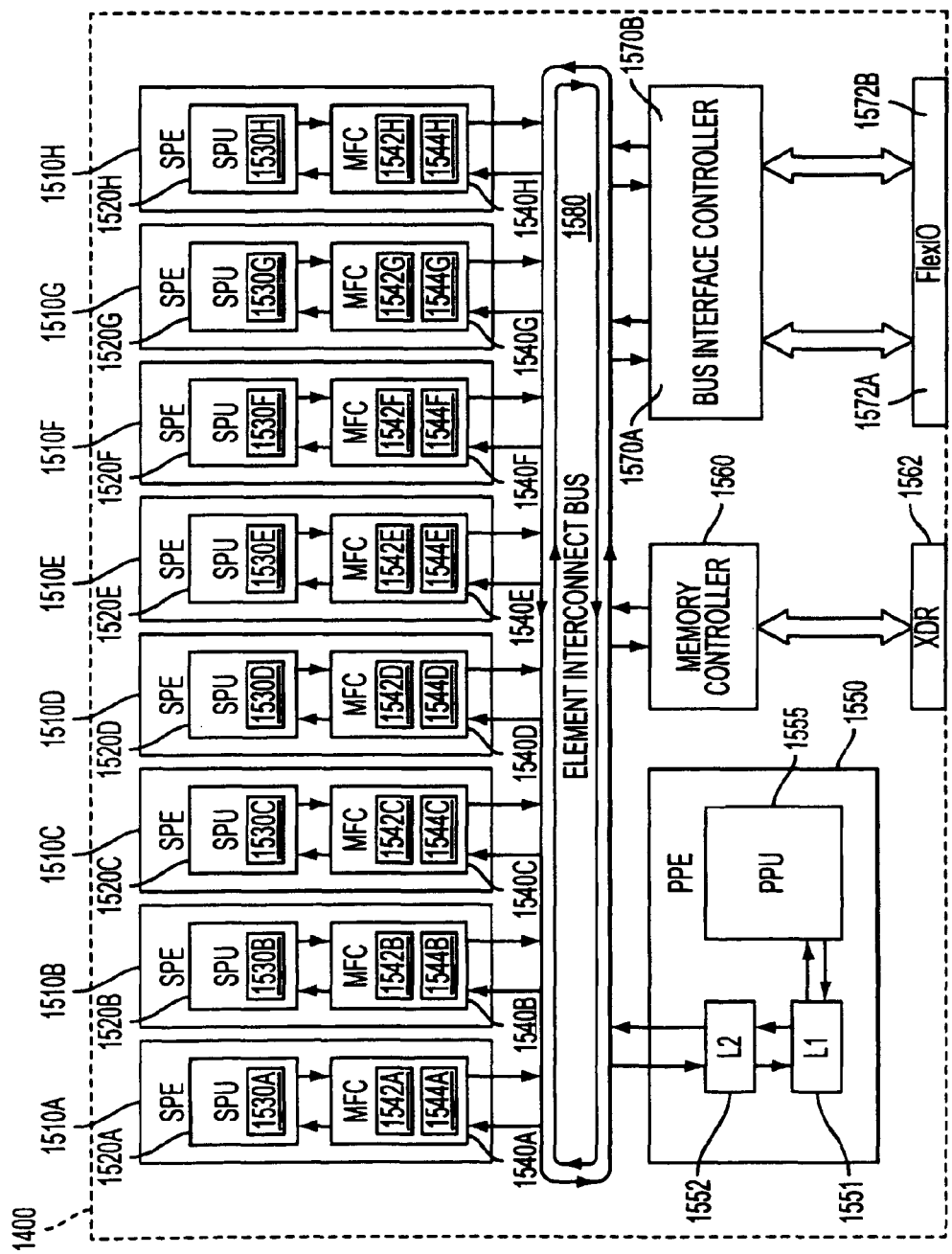
FIG. 9 illustrates additional hardware that may be used to process instructions, in accordance with one embodiment of the present invention.

FIG. 9 illustrates additional hardware that may be used to process instructions, in accordance with one embodiment of the present invention. Cell processor 1428 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Data sent by the Cell processor 1428 to the Reality Simulator graphics unit 1430 will typically comprise display lists, being a sequence of commands to draw vertices, apply textures to polygons, specify lighting conditions, and so on. Embodiments may include capturing depth data to better identify the real-world user and to direct activity of an avatar or scene. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a multiple camera configuration that triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

Figure 10:
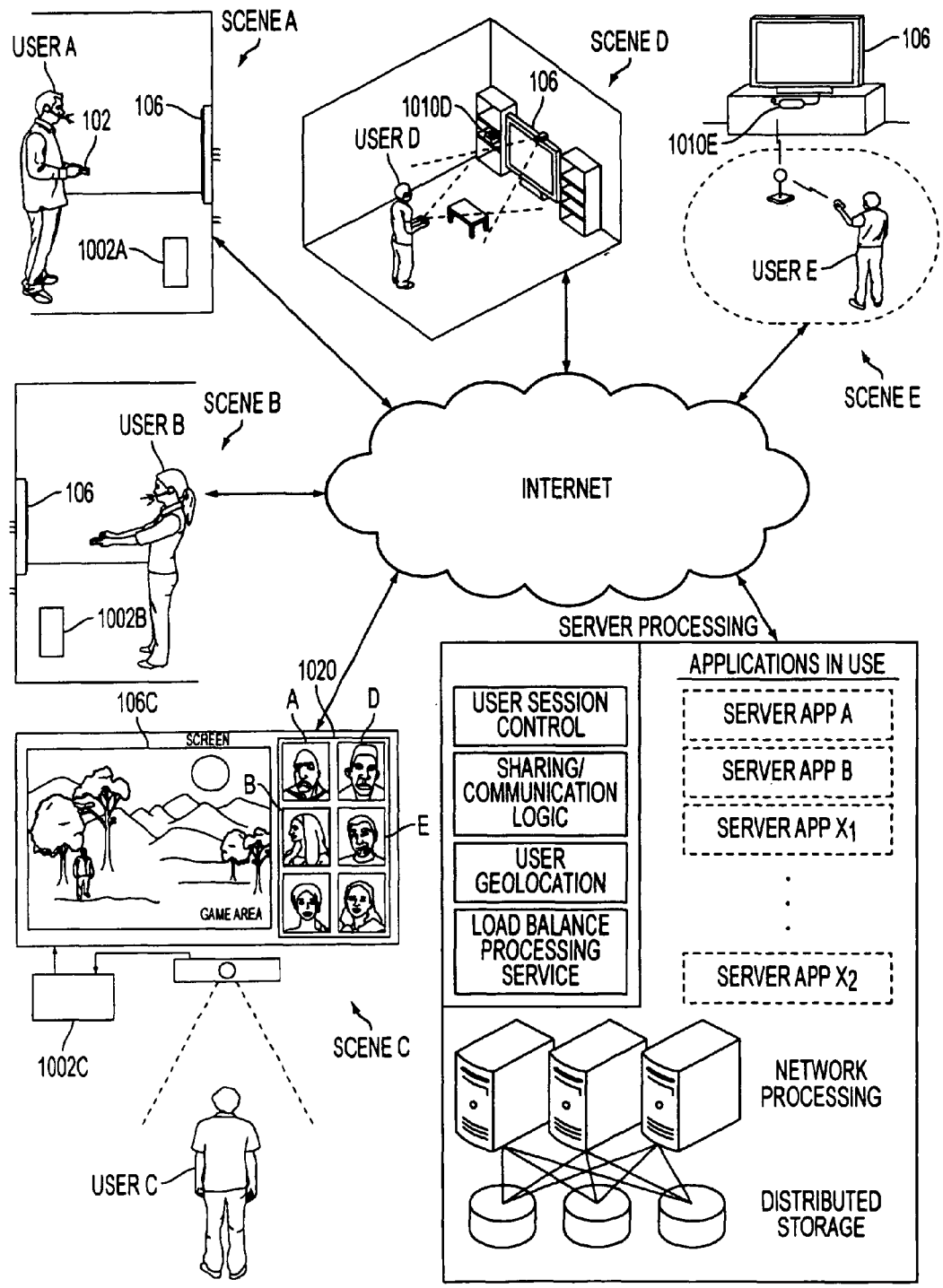
FIG. 10 is an exemplary illustration of scene A through scene E with respective user A through user E interacting with game clients that are connected to server processing via the internet, in accordance with one embodiment of the present invention.

FIG. 10 is an exemplary illustration of scene A through scene E with respective user A through user E interacting with game clients or game consoles 1002 that are connected to server processing via the internet, in accordance with one embodiment of the present invention. As previously discussed, a game client is a device that allows users to connect to server applications and processing via the internet. The game client allows users to access and playback online entertainment content such as but not limited to games, movies, music and photos. Additionally, the game client can provide access to online communications applications such as VoIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 10, user A interacts with a client application displayed on a monitor 106 using a controller 102 paired with game client 1002A. Similarly, within scene B, user B interacts with another client application that is displayed on monitor 106 using a controller 102 paired with game client 1002B. Scene C illustrates a view from behind user C as he looks at a monitor displaying a game and buddy list from the game client 1002C. While FIG. 10 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1002 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

As shown in FIG. 10, the server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1002C allows user C to create and view a buddy list 1020 that includes user A, user B, user D and user E. As shown, in scene C, user C is able to see either real time images or avatars of the respective user on monitor 106C. Server processing executes the respective applications of game client 1002C and with the respective game clients 1002 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen. Scene D and scene E illustrate respective user D and user E interacting with game consoles 1010D and 1010E respectively. Each game console 1010D and 1010E are connected to the server processing module and illustrate a network where the server processing modules coordinates game play for both game consoles and game clients.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing interactive communication received from input devices interfacing with a computer program that is executed at a computer, comprising:
   receiving input data from a first input device and a second input device at a base station that is interfaced with the computer, the first and second input devices being movable independently of one another to interactively interface with the computer program;
   tracking a position of the first and second input devices through the base station;
   identifying a near-identical change in position of the tracked position of the first and second input devices; and
   setting a flag upon identifying the near-identical change in position, the flag being processed by the computer program to set an action to take during interactivity with the computer program,
   wherein the near-identical change in position has a magnitude, and if the magnitude exceeds a threshold level, the flag is processed to set the action,
   wherein the magnitude exceeding the threshold level is indicative of a movement in the base station.

2. The method as recited in claim 1, wherein the action to take during interactivity with the computer program is preconfigured based on aspects of the computer program.

3. The method as recited in claim 2, wherein the computer program is a computer game, and wherein the action to take is one of subtracting out the near-identical change in position, apply a correction to both the first and second input devices, pausing the computer game, rewinding the computer game, restarting the computer game, or signaling movement of the base station.

4. The method as recited in claim 1, further comprising,
   processing inertial sensing operations at the base station, the inertial sensing operations determining a magnitude of movement of the base station.

5. The method as recited in claim 1, wherein tracking the position of the first and second input devices includes one of or a combination of either: (a) receiving position data from the first and second input devices, (b) calculating position data at the base station from data received from the first and second input devices, (c) calculating position data at the computer based on data received from the first and second input devices or the base station, (d) partially determining position at the first and second input devices and partially determining position at the base station; or (e) partially determining position data based on data obtained from the first and second input devices, the base station, and the computer.

6. The method as recited in claim 5, wherein the position is processed by one or more of image processing, ultrasonic data processing, input joy-stick movement, pitch-roll-yaw data, wired or wireless input, or input button selection.

7. The method as recited in claim 1, wherein the computer is a game console, and the first and second input devices are further interfaced with the game console.

8. The method as recited in claim 7, wherein image processing includes comparing image data from one or more frames that contains both of the first and second input devices to identify the near-identical change in position has occurred.

9. The method as recited in claim 7, wherein the base station is interfaced with the game console through either a wired connection or a wireless connection.

10. Computer readable media having program instructions for processing interactive communication received from input devices interfacing with a computer program that is executed at a computer, comprising:
   program instructions for receiving input data from a first input device and a second input device at a base station that is interfaced with the computer, the first and second input devices being movable independently of one another to interactively interface with the computer program;
   program instructions for tracking a position of the first and second input devices through the base station;
   program instructions for identifying a near-identical change in position of the tracked position of the first and second input devices; and
   program instructions for setting a flag upon identifying the near-identical change in position, the flag being processed by the computer program to set an action to take during interactivity with the computer program,
   wherein the near-identical change in position has a magnitude, and if the magnitude exceeds a threshold level, the flag is processed to set the action,
   wherein the magnitude exceeding the threshold level is indicative of a movement in the base station.

* * * * *